US006832023B1

(12) United States Patent
Gaylord et al.

(10) Patent No.: US 6,832,023 B1
(45) Date of Patent: Dec. 14, 2004

(54) OPTICAL FIBER GRATINGS WITH AZIMUTHAL REFRACTIVE INDEX PERTURBATION, METHOD OF FABRICATION, AND DEVICES FOR TUNING, ATTENUATING, SWITCHING, AND MODULATING OPTICAL SIGNALS

(75) Inventors: Thomas K. Gaylord, Atlanta, GA (US); Gregory D. Van Wiggeren, Los Gatos, CA (US); Donald D. Davis, Duluth, GA (US); Elias N. Glytsis, Dunwoody, GA (US); Emmanuel Anemogiannis, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 221 days.

(21) Appl. No.: 09/860,790

(22) Filed: May 18, 2001

Related U.S. Application Data

(60) Provisional application No. 60/205,990, filed on May 19, 2000.

(51) Int. Cl.[7] .............................................. G02B 6/34
(52) U.S. Cl. ......................... 385/37; 385/28; 385/124
(58) Field of Search ........................... 385/8, 10, 27–29, 385/31, 37, 123, 124

(56) References Cited

U.S. PATENT DOCUMENTS

| | | | |
|---|---|---|---|
| 4,476,161 A | 10/1984 | Pohle et al. ................. | 427/162 |
| 5,430,817 A | 7/1995 | Vengsarkar .................. | 385/37 |
| 5,647,039 A | 7/1997 | Judkins et al. ............... | 385/37 |
| 5,703,978 A | 12/1997 | DiGiovanni et al. .......... | 385/37 |
| 5,757,540 A | 5/1998 | Judkins et al. ............... | 359/341 |
| 5,837,169 A * | 11/1998 | Rourke ........................ | 385/10 |
| 5,847,862 A | 12/1998 | Chraplyvy et al. .......... | 359/337 |
| 5,852,690 A * | 12/1998 | Haggans et al. .............. | 385/37 |
| 5,857,043 A | 1/1999 | Cook et al. .................. | 385/37 |
| 5,864,641 A | 1/1999 | Murphy et al. ............... | 385/12 |
| 5,907,647 A | 5/1999 | Eggleton et al. ............. | 385/28 |
| 5,945,666 A | 8/1999 | Kersey et al. ......... | 250/227.14 |
| 5,999,671 A | 12/1999 | Jin et al. ...................... | 385/37 |
| 6,004,703 A | 12/1999 | Jang et al. .................... | 430/5 |
| 6,005,999 A * | 12/1999 | Singh et al. .................. | 385/37 |
| 6,011,886 A | 1/2000 | Abramov et al. ............. | 385/375 |
| 6,021,240 A | 2/2000 | Murphy et al. ............... | 385/37 |
| 6,035,082 A | 3/2000 | Murphy et al. ............... | 385/37 |
| 6,035,083 A | 3/2000 | Brennan, III et al. ......... | 385/37 |
| 6,046,841 A | 4/2000 | Mahgerefteh et al. ...... | 359/326 |
| 6,055,348 A | 4/2000 | Jin et al. ...................... | 385/37 |
| 6,058,226 A | 5/2000 | Starodubov .................. | 385/12 |
| 6,078,709 A | 6/2000 | Abramov et al. ............. | 385/37 |
| 6,097,862 A | 8/2000 | Abramov et al. ............. | 385/37 |
| 6,108,470 A | 8/2000 | Jin et al. ...................... | 385/37 |
| 6,111,999 A * | 8/2000 | Espindola et al. ............ | 385/37 |
| 6,130,974 A | 10/2000 | Rivoallan ..................... | 385/37 |

OTHER PUBLICATIONS

Article entitled "Bending–induced birefringence in single–mode fibers" by R. Ulrich, et al., Jun. 1980, Optics Letters, vol. 5, No. 6, pp. 273–275.

(List continued on next page.)

*Primary Examiner*—Hemang Sanghavi
*Assistant Examiner*—Omar Rojas
(74) *Attorney, Agent, or Firm*—Thomas, Kayden, Horstemeyer & Risley, LLP

(57) ABSTRACT

The present invention relates to a type of optical fiber grating having an azimuthal refractive-index perturbation. The optical fiber includes a fiber grating that has a plurality of grating elements formed therein. At least one of the grating elements has a spatially varying index of refraction that varies azimuthally about the centerline of the optical fiber. The fiber grating acts as a band-stop optical spectral filter. In addition, since fiber-cladding modes are weakly-guided modes, their power can be easily dissipated by scattering, bending, stretching, and/or rotating the optical fiber. Multiple configurations of these gratings within an optical fiber are given. Methodologies are given for the fabrication of these gratings. Devices are presented which can dynamically attenuate, tune, switch, or modulate the wavelength spectral characteristics of an optical signal.

43 Claims, 12 Drawing Sheets

OTHER PUBLICATIONS

Article entitled "Birefringence induced by bends and twists in single–mode optical fiber" by A.M. Smith, Aug. 1, 1980, Applied Optics, vol. 19, No. 15., pp. 2606–2611.

Article entitled "Bending Effects in Optical Fibers" by Henry F. Taylor, Oct. 1984 Journal of Lightwave Technology, vol. LT–2, No. 5, pp. 617–628.

Article entitled "Photoinduced refractive–index changes in germanosilicate fibers" by D.P. Hand and P. St. J. Russell, dated Jan. 15, 1990, Optics Letters. vol. 15, No. 2, pp. 102–104.

Article entitled "Chirped in–fiber Bragg gratings for compensation of optical–fiber dispersion" by Hill, et al., dated Sep. 1, 1994, Optics Letters, vol. 19, No. 17, pp. 1314–1316.

Article entitled The UV–induced refractive index grating in Ge:SiO$_2$ performs: additional CW experiments and the macroscopic origin of the change in index, dated 1996, J. Phys. D: Appl. Phys. 29, pp. 1842–1856.

Article entitled "Long–Period Fiber Gratings as Band–Rejection Filters" by Vengsarkar, et al., dated Jan. 1996, Journal of Lightwave Technology, vol. 14, No., pp. 58–65.

Article entitled "Long–period fiber–grating–based gain equalizers" by Bergano and Davidson, dated Mar. 1, 1996, Optics Letters, vol. 21, No. 5, pp. 336–338.

Article entitled "Long–period fiber gratings shape optical spectra" by Ashish M. Vangsarkar, dated Jun. 1996, Laser Focus World, pp. 243–248.

Article entitled "Fabrication of rocking filters at 193 nm" by Psaila and de Sterke, dated Oct. 1, 1996, Optics Letters, vol. 21, No. 19, pp. 1550–1552.

Article entitled "All–optical switching in long–period fiber gratings" by Eggleton, et al., dated Jun. 15, 1997, Optics Letters, vol. 22, No. 12, pp. 883–885.

Article entitled "Cladding–mode resonances in short– and long– period fiber grating filters" by Turan Erdogan dated Aug. 1997, J. Optical Society of America, vol. 14, No. 8, pp. 1760–1773.

Article entitled "Fiber Grating Spectra" by Turan Erdogan, dated Aug. 1997, Journal of Lightwave Technology, vol. 15, No. 8, pp. 1277–1294.

Article entitled "Thermo–Induced Long–Period Fibre Gratings" by Dianov, et al., dated Sep. 22–25, 1997, ECOC 97, Conference Publication No. 448, pp. 53–56.

Article entitled "High–Performance Optical Fiber Polarizers Based on Long–Period Gratings in Birefringent Optical Fibers" by Ortega, et al., dated Oct. 1997, Photonics Tech. Letters, vol. 9, No. 10, pp. 1370–1372.

Article entitled Broad–Band Erbium–Doped Fiber Amplifier Flattened Beyond 40 nm Using Long–Period Grating Filter, by Wysocki, et al., dated Oct. 1997, Photonics Tech. Letters, vol. 9, No. 10,pp. 1343–1345.

Article entitled "Long period gratings formed in depressed cladding fibres", by Dong, et al., dated Oct. 23, 1997, Electronics Letters, vol. 33, No. 22, pp. 1897–1898.

Article entitled "Independent tuning of cascaded long period fibre gratings for spectral shaping" by Xu, et al. dated Oct. 23, 1997, Electronics Letters vol. 33, No. 22, pp. 1893–1894.

Article entitled Displacements of the resonant peaks of a long–period fiber grating induced by a change of ambient refractive index by Lee et al., dated Dec. 1, 1997, Optics Letters, vol. 22, No. 23, pp. 1769–1771.

Article entitled Heat transfer modelling in CO$_2$ laser processing of optical fibers by Grellier et al., dated Jul. 1, 1998, Optics Communications 152, pp. 324–328.

Article entitled "Long period fibre gratings for structural bend sensing" by H.J. Patrick et al., dated Sep. 3, 1988, Electronics Letters, vol. 34, No. 18, pp. 1773–1775.

Article entitled "Analysis of Response of Long Period Fiber Gratings to External Index of Refraction" by Heather Patrick et al., dated Sep. 1998, Journal of Lightwave Technology, vol. 16, No. 9, pp. 1606–1612.

Article entitled "Generalized Expression for the Growth of Long Period Gratings" by Trevor MacDougall et al. dated Oct. 1998, IEEE Photonics Technology Letters, vol. 10, No. 10, pp. 1449–1451.

Article entitled "Bending sensitivity of in–series long–period fiber gratings" by Lee and Nishii, dated Oct. 15, 1998, Optics Letters, vol. 23, No. 20, pp. 1624–1626.

Article entitled "All–Fiber Bandpass Filter with Adjustable Transmission Using Cladding–Mode Coupling" by Starodubov et al., dated Nov. 1998, IEEE Photonics Technology Letters, vol. 10, No. 11, pp. 1590–1592.

Article entitled "Demonstration of long–period–grating efficient couplings with an external medium of a refractive index higher than that of silica" by Duhem et al., dated Nov. 1, 1998, Applied Optics vol. 37, No. 31, pp. 7223–7228.

Article entitled "Fabrication of Long–Period Fiber Gratings with No Harmonics" by Grubsky et al., dated Jan. 1999, IEEE Photonics Technology Letters, vol. 11, No. 1, pp. 87–89.

Article entitled "Applications of long–period gratings to single and multi–parameter sensing" by Vikram Bhatia, dated May 24, 1999, Optics Express, vol. 4, No. 11, pp. 457–466.

Article entitled "An Efficient Inverse Scattering Algorithm for the Design of Nonuniform Fiber Bragg Gratings" by Feced et al., dated Aug. 1999, IEEE Journal of Quantum Electronics, vol. 35, No. 8, pp. 1105–1115.

Article entitled "Enhanced photosensitivity in germanosilicate fibers exposed to CO$_2$ laser radiation" by Brambilla et al., dated Aug. 1, 1999, Optics Letters, vol. 24, No. 15, pp. 1023–1025.

Article entitled "Optical low–coherence reflectometry characterization of cladding modes excited by long–period fiber gratings" by Varelas et al., dated Aug. 15, 1999, Optics Letters, vol. 25, No. 16, pp. 1106–1108.

Article entitled "Long–period fiber gratings based on periodic microbends" by Hwang et al., Sep. 15, 1999, Optics Letters, vol. 24, No. 18, pp. 1263–12265.

Article entitled "Dispersion control with use of long–period fiber gratings" by D.B. Stegall and T. Erdogan, dated Feb. 2000, J. Opt. Soc. Am. A, vol. 17, No. 2, pp. 304–312.

Article entitled "Carbon dioxide laser–assisted poling of silicate–based optical fibers" by Blazkiewicz et al., dated Feb. 15, 2000, Optics Letters, vol. 25, No. 4, pp. 200–202.

Article entitled "Nonlinear Pulse Switching Using Long–Period Fiber Gratings" by V.E. Perlin and H.G. Winful, dated Mar. 2000, Journal of Lightwave Technology, vol. 18, No. 3, pp. 329–333.

Article entitled "Long–period fibre gratings written by CO$_2$ exposure of H$_2$–loaded, standard fibres" by Drozin et al., dated Apr. 13, 2000, Electronics Letters, vol. 36, No. 8, pp. 1–2.

Article entitled "Electrically Controllable Long–Period Liquid Crystal Fiber Gratings" by Jeong et al., dated May 2000, IEEE Photonics Technology Letters, vol. 12, No. 5, pp. 519–521.

Article entitled "Optical Bend Sensor Based on Measurement of Resonance Mode Splitting of Long–Period Fiber Grating" by Zhang et al., dated May 2000, IEEE Photonics Technology Letters, vol. 12, No. 5, pp. 531–533.

Article entitled "Control of the characteristics of a long–period grating by cladding etching" by Kim et al., dated May 1, 2000, Applied Optics, vol. 39, No. 13, pp. 2038–2042.

Article entitled "Simultaneous temperature and bend sensing with long–period fiber gratings" by Ye et al., dated Jul. 15, 2000, Optics Letters, vol. 25, No. 14., pp. 1007–1009.

Article entitled "Tunable mechanically induced long–period fiber gratings" by Savin et al., dated May 15, 2000, Optics Letters, vol. 25, No. 10, pp. 710–712.

Article entitled "Temperature insensitive fiber optic accelerometer using a chirped Bragg grating" by Stephanus J. Spammer and Peter L. Fuhr, dated Aug. 2000, Opt. Eng. 39(8) pp. 2177–2181.

Article entitled "Inscription kinetics and thermal stability of Bragg gratings written within heated fibers" by Bernage et al., undated, SPIE vol. 2841, pp. 70–83.

Article entitled "Spectral Characteristics of Curved Long Period Fiber Gratings" by Diego et al., Undated $14^{th}$ International Conference on Optical Fiber Sensors, P3–43, pp. 850–853.

Article entitled "Wavelength–selective coupler and add–drop multiplexer using long–period fiber gratings" by Grubsky et al., Undated, pp. 1–3.

Article entitled "Temperature and residual stress evolution in $CO_2$ laser irradiated glass" by Guignard et al., Undated, pp. 1–6.

Article entitled "Long period fiber gratings: sensors, sources and beyond" by Heather J. Patrick, Undated pp. 24–33.

Article entitled "Laser Material processing of glasses with $CO_2$ lasers" by G. Staupendahl and P. Gerling, Undated, SPIE vol. 3097, pp. 670–676.

Article entitled "Axial rotation dependence of resonances in curved $CO_x$–laser induced long–period fibre gratings" by G.D. Van Wiggeren, et al., dated Aug. 3, 2000, Electronics Letters, vol. 36, No. 16, pp. 1354–1355.

Article entitled "Tuning, attenuating, and switching by controlled flexure of long–period fiber gratings" by Gregory D. VanWiggeren, et al., dated Jan. 15, 2001, Optics Letters, vol. 26, No. 2, pp. 61–63.

Article entitled "Automated flexure testing of axially rotated optical fiber gratings" by B.L. Bachin and T.K. Gaylord, dated Oct. 2002, Review of Scientific Instruments, vol. 73, No. 10, pp. 3454–3457.

Article entitled "Transmission Characteristics of Long–Period Fiber Gratings Having Arbitrary Azimuthal/Radial Refractive Index Variations" by E. Anemogiannis, et al., dated Jan. 2003, Journal of Lightwave Technology, vol. 21, No. 1., pp. 218–227.

Article entitled "Characteristics of Long–Period Fiber Grating Utilizing Periodic Stress Relaxation" by Yamasaki, et al., dated Mar. 2000, IEICE Trans. Electron., vol. E83–C, No. 3, pp. 440–443.

Article entitled "Long–period fibre gratings written by $CO_2$ exposure of $H_2$–loaded, standard fibres" by Drozin, et al., dated Apr. 13, 2000, Electronics Letters, vol. 36, No. 8, pp. 742–744.

Article entitled "Induction of the refractive index change in B–doped optical fibers through relaxation of the mechanical stress" by Kim et al., dated Nov. 15, 2000, Optics Communications 185 (2000), pp. 337–342.

Article entitled "Characteristics of novel long–period fibre gratings written by focused high–frequency $CO_2$ laser pulses" by Rao, et al., SPIE vol. 4581, APOC 2001, Beijing, China (2001), pp. 327–333.

Article entitled "Fabrication of Azimuthally Symmetric Long–Period Fiber Gratings with $CO_2$ Laser" by Oh, et al., dated Jul. 2, 2001–Jul. 5, 2001, OECC/IOOC 2001 Conference Incorporating ACOFT, pp. 22–23.

Article entitled "Fabrication of Long–Period Fiber Gratings with a $CO_2$ Laser" by Paek, et al., dated Jul. 2, 2001–Jul. 5, 2001, OECC/IOCC 2001 Conference Incorporating ACOFT, pp. 106–109.

Article entitled "Miniature all–fiber devices based on $CO_2$ laser microstructuring of tapered fibers", by Kakarantzas, et al., dated Aug. 1, 2001, vol. 26, No. 15, Optics Letters, pp. 1137–1139.

Article entitled "Residual stress relaxation in the core of optical fiber by $CO_2$ laser irradiation" by Kim, et al., dated Nov. 1, 2001, vol. 26, No. 21, Optics Letters, pp. 1657–1659.

Article entitled A Novel Fiber–Optic Torsion Sensor Based on a $CO_2$–Laser–Induced Long–Period Fiber Grating, by Wang, et al., dated Jan. 2002, IEEE, pp. 147–150.

Article entitled "Effect of $CO_2$ laser irradiation on the refractive–index change in optical fibers" by Kim, et al., dated Jul. 1, 2002, vol. 41, No. 19, Applied Optics, pp. 3809–3815.

Article entitled "A Novel Tunable Gain Equalizer Based on a Long–Period Fiber Grating Written by High–Frequency $CO_2$ Laser Pulses", by Wang et al., dated Feb. 2003, IEEE Photonics Technology Letters, vol. 15, No. 2, pp. 251–253.

Article entitled "Strong resonance and a highly compact long–period grating in a large–mode–area photonic crystal fiber", by Zhu, et al., dated Aug. 11, 2003, vol. 11, No. 16, Optics Express, pp. 1900–1905.

* cited by examiner

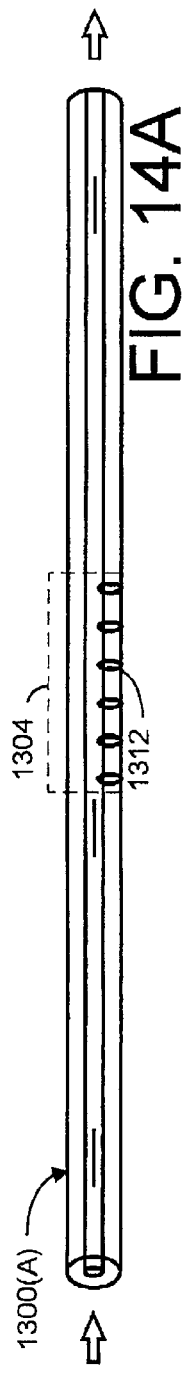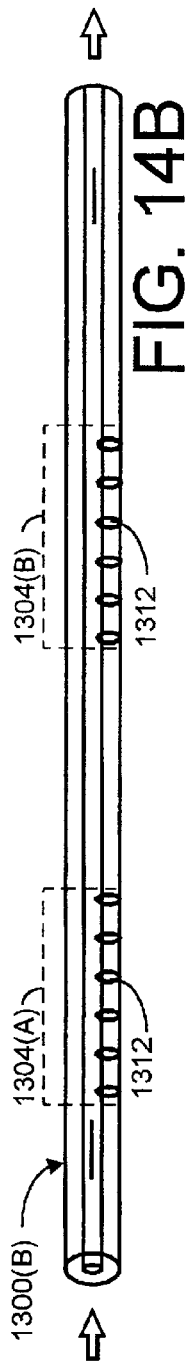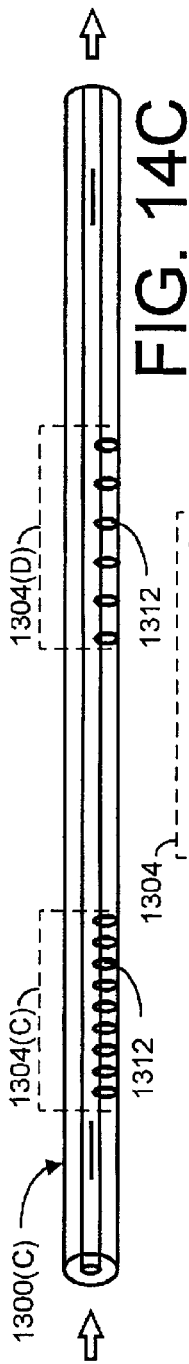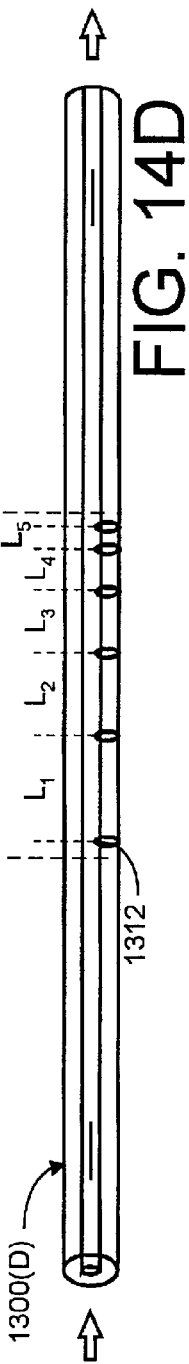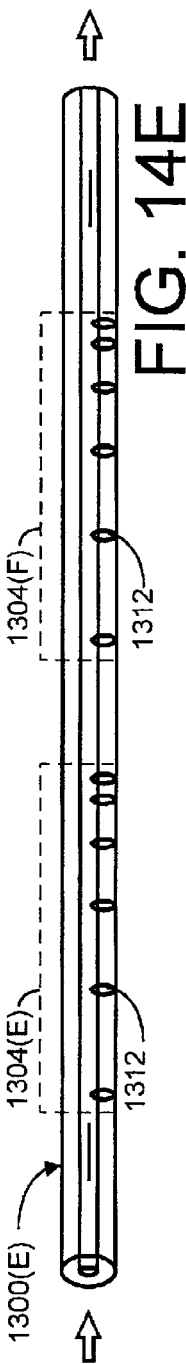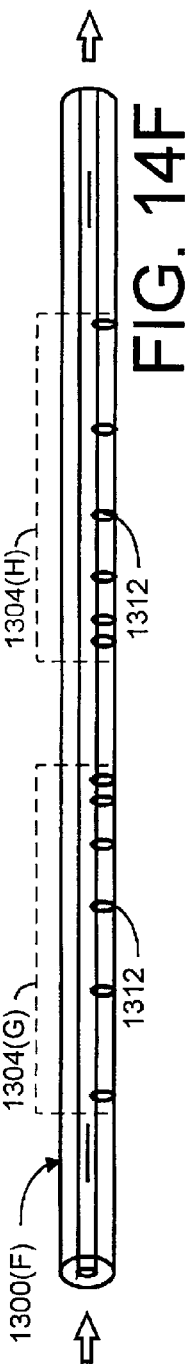

*# OPTICAL FIBER GRATINGS WITH AZIMUTHAL REFRACTIVE INDEX PERTURBATION, METHOD OF FABRICATION, AND DEVICES FOR TUNING, ATTENUATING, SWITCHING, AND MODULATING OPTICAL SIGNALS

CROSS-REFERENCE TO RELATED APPLICATION

This application claims priority to copending U.S. provisional application entitled, "Long Period Fiber Grating Wavelength Tuners/Modulators/Switches," having Ser. No. 60/205,990, filed May 19, 2000, which is entirely incorporated herein by reference.

STATEMENT REGARDING FEDERALLY SPONSORED RESEARCH OR DEVELOPMENT

The U.S. government may have a paid-up license in this invention and the right in limited circumstances to require the patent owner to license others on reasonable terms as provided for by the terms of grant no. EEC-94-02723 awarded by the National Science Foundation.

FIELD OF THE INVENTION

The present invention is directed, in general, to optical fiber gratings, to their fabrication, and to their use as devices in optical systems.

BACKGROUND OF THE INVENTION

Optical gratings are useful in controlling the paths of propagating light, particularly light composed of multiple wavelengths. Optical gratings are useful in manipulating the transmittance and/or the propagation direction of particular wavelengths within an optical signal. Since optical signals propagate inside optical waveguides, an optical grating consists of a periodic perturbation (variation) of an optical-waveguide parameter such as the real and/or imaginary part of its refractive index or its thickness. One of the most important types of optical waveguides is the optical fiber. Basically, optical fibers are thin strands of glass capable of transmitting information-containing optical signals over long distances with very low loss. In essence, an optical fiber is a small diameter waveguide comprising a core having a first index of refraction surrounded by a cladding having a second (lower) index of refraction. Provided the refractive index of the core exceeds that of the cladding, a light beam propagated within the core may exhibit total internal reflection, and is guided along the length of the core. Typical optical fibers are made of high purity silica with various concentrations of dopants added to control the index of refraction. Optical fibers that have gratings, perturbations in the refractive index, are of particular interest as components in modern multi-wavelength communication systems, such as wavelength-division-multiplexed optical communication systems.

In-fiber optical gratings are important elements for selectively controlling specific wavelengths of light transmitted within optical systems such as wavelength-division-multiplexed optical communication systems. Such gratings may include short-period fiber Bragg gratings and long-period fiber gratings. These gratings typically comprise a body of material with a plurality of spaced-apart optical grating elements disposed in the material. Often, the grating elements comprise substantially equally-spaced refractive index or optical absorption perturbations. For all types of gratings, it would be highly useful to be able to reconfigure the grating to adjust selectively the controlled wavelengths.

A cladding mode is a mode of light that is not confined to the core, but rather, is confined by the entire waveguide structure. Long-period fiber grating devices selectively forward-diffract light at specific wavelengths by providing coupling between core modes and cladding modes. In general, short-period fiber Bragg gratings can also diffract light into cladding modes. In this case, the cladding modes are back-diffracted. The period, $\Lambda$, of the perturbations is chosen to shift transmitted light in the region of a selected peak wavelength, $\lambda_p$, from a core guided mode into a cladding mode, thereby reducing in intensity a band of light having wavelengths centered about the peak wavelength $\lambda_p$. In other words, the fiber grating acts as a band-stop optical spectral filter. In addition, since fiber cladding-modes are weakly-guided modes, their power can be easily dissipated by scattering, bending, stretching, and/or rotating the optical fiber. Such devices are particularly useful for equalizing amplifier gains across a band of wavelengths used in optical communications systems.

Typically, the spacing between the periodic perturbations in a long-period grating is large compared to the freespace wavelength $\lambda$ of the transmitted light. In contrast with conventional short-period fiber Bragg gratings, long-period gratings use a periodic spacing $\Lambda$ that is typically about a hundred times larger than the transmitted freespace wavelength. In some applications, such as chirped gratings, the spacing $\Lambda$ can vary along the length of the grating.

A difficulty with conventional short-period fiber gratings and long-period fiber gratings, however, is their inability to change (tune) dynamically their spectral characteristics. Each short-period fiber grating and each long-period grating with a given periodicity ($\Lambda$) selectively filters light with an unchanging attenuation and in an unchanging narrow bandwidth centered around the peak wavelength of coupling, $\lambda_p$. This wavelength is determined by $\lambda_p = (N_{core} \pm N_{cladding}) \Lambda$, where $N_{core}$ and $N_{cladding}$ are the guided-mode effective indices of the core and the cladding modes, respectively. The "+" sign is valid for the case of backward-diffracted light by short-period gratings and the "−" sign is valid for forward-diffracted light by long-period gratings. The value of $N_{core}$ and $N_{cladding}$ depend on the wavelength, on the core, cladding, and surrounding medium refractive indices, and on the core and cladding radii.

Various techniques have been developed to extract light from the core of an optical fiber so that the light may be modulated or filtered. In one approach, part of the cladding surrounding the core of the optical fiber is polished away on one side of the fiber so that a portion of the light in the core can be coupled into the cladding. In another approach, disclosed in U.S. Pat. No. 6,058,226, which is hereby incorporated by reference, a voltage is applied to an electrically sensitive material coupled to the exterior an optical fiber. The applied voltage is used for modulating the light being transmitted through the optical fiber. In yet still another approach, disclosed in U.S. Pat. No. 6,055,348, which is hereby incorporated by reference, a longitudinal strain is applied to a fiber grating so that the spacing between the grating elements are changed to shift the wavelength response of the device to provide a tunable optical grating device.

Multi-wavelength communication systems require continuous adjustment of the signal levels. If the signal adjustment is wavelength independent then these devices are called variable optical attenuators (VOA), while for the case of wavelength dependent attenuation they are called variable gain flattening filters. As a first example, in pre-emphasis filtering, some wavelength channels need to be equalized in intensity before they are combined in the fiber. As a second example, the reconfiguration and reallocation of wavelengths among the various nodes of a network by add/drop filtering requires these wavelength channels to be balanced in intensity with the optical network. As a third example, the gain of optical amplifiers, such as erbium-doped optical amplifiers, needs to be the same for all wavelengths, thus requiring wavelength-by-wavelength control of the optical gain. Optical amplifiers have deleterious peaks in their gain spectra that need to be flattened. As a fourth example, an adjustable wavelength and attenuation filter is needed for suppressing amplifier spontaneous emission (ASE) in optical amplifiers. As a fifth example, in a related application, there is a need to control the output power of tunable lasers to be constant over multiple wavelength ranges in order to provide a constant output power over any selected wavelength range.

Multi-wavelength communication systems also require network control functions to be available. As a first example, each wavelength channel should be tagged or labeled. This can be accomplished by modulating each channel wavelength with a slightly different kilohertz frequency. As a second example, network supervisory information needs to be distributed within the existing optical network (without resorting to external wire-based communications) and without affecting any of the data channels within the optical network. This can be done by modulating the existing data channels at kilohertz frequencies with the supervisory information to be distributed.

All of the above needs require a device whose transmission can be controlled in wavelength and amplitude. Adjusting the fiber grating as described in this invention allows tuning of the center wavelength or the adjustment of the attenuation at a fixed wavelength or a combination of these. As such, an adjustable fiber grating is capable of fulfilling all of the above listed application needs. Generally, prior art optical fiber gratings have grating elements that are typically disposed in the optical fiber core and perpendicular to the longitudinal centerline of the optical fiber. However, there are also optical fiber gratings that have grating elements that are slanted, instead of perpendicular, with respect to the centerline of the optical fiber. Several patents also exemplify fiber gratings with slanted refractive-index variation, which are U.S. Pat. No. 5,430,817 to A. M. Vengsarkar, U.S. Pat. No. 5,764,829 to J. Boyd et al. It is accordingly an object of the present invention to provide a new class of fiber gratings.

SUMMARY OF THE INVENTION

The present invention provides an apparatus and method for tuning, attenuating, switching, and modulating optical signals in a waveguide.

Briefly described, in architecture, one embodiment of the apparatus, among others, can be implemented as follows. A length of optical comprising a core region with a refractive index distribution and a cladding region with a refractive index distribution, the cladding region disposed on the core region. The optical fiber includes an azimuthally varying grating element. The optical properties of the optical fiber are changed by physical manipulation of the optical fiber.

The present invention can also be viewed as providing methods for selecting the coupling between modes in an optical fiber. In this regard, one embodiment of such a method, among others, can be broadly summarized by the following steps: an optical fiber having a grating region, which includes at least one azimuthally varying grating element, is disposed in an optical network; and the optical fiber is oriented in a predetermined position. The coupling between optical modes in the optical fiber are related to the positioning of the optical fiber.

The present invention can also be viewed as providing methods for making grating elements that have azimuthal variation in an optical fiber. In this regard, one embodiment of such a method, among others, can be broadly summarized by the following steps: disposing a length of optical fiber in a predetermined position; and heating a portion of the optical fiber. The heating of the optical fiber produces a perturbation in the refractive index of the heated portion of the optical. An alternative embodiment for making a grating element having an azimuthal variation can be broadly summarized by the following steps: disposing a dopant in a non-uniform pattern in an optical fiber; and irradiating the dopant with a laser beam. The irradiation by the laser beam of the dopant in the optical fiber produces a perturbation in the refractive index in the portion of the optical fiber having the dopant. disposed therein.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIGS. 14A–14B show exemplary configurations of fiber gratings in optical fibers.

DETAILED DESCRIPTION

The present invention is directed to an improved type of fiber grating possessing a general azimuthal refractive index variation, as well as a fabrication method, and optical devices for adjusting the optical characteristics of the grating. The optical adjustment device provides a means for tuning, attenuating, switching, and modulating optical signals in the waveguide. For the purposes of this disclosure, a preferred embodiment is discussed with the optical adjustment device disposed in an optical fiber containing a long-period fiber grating (LPFG). It is to be understood that the invention includes, but is not limited to, in-fiber gratings, such as LPFGs and short-period fiber Bragg gratings.

Figure 1A:
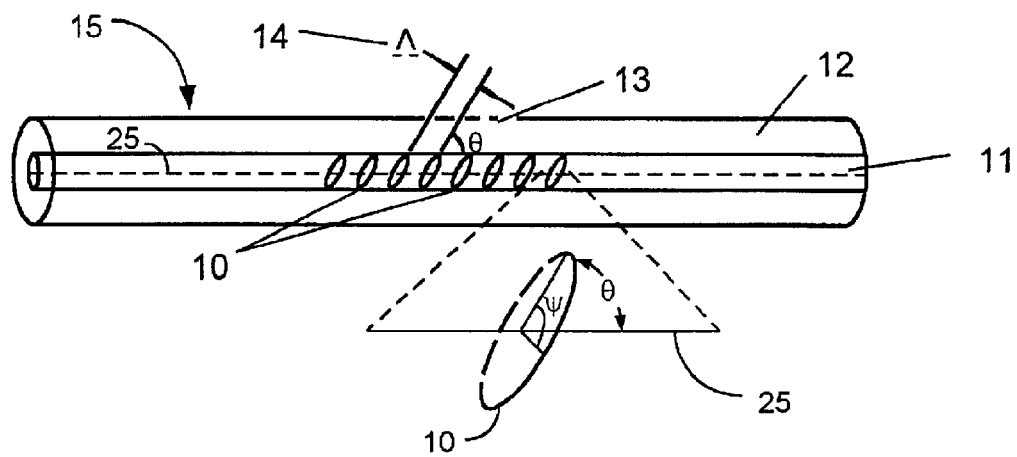
FIG. 1A shows a schematic illustration of a fiber grating having slanted refractive index variation in the form of a slanted-fringe grating.
Figure 1B:
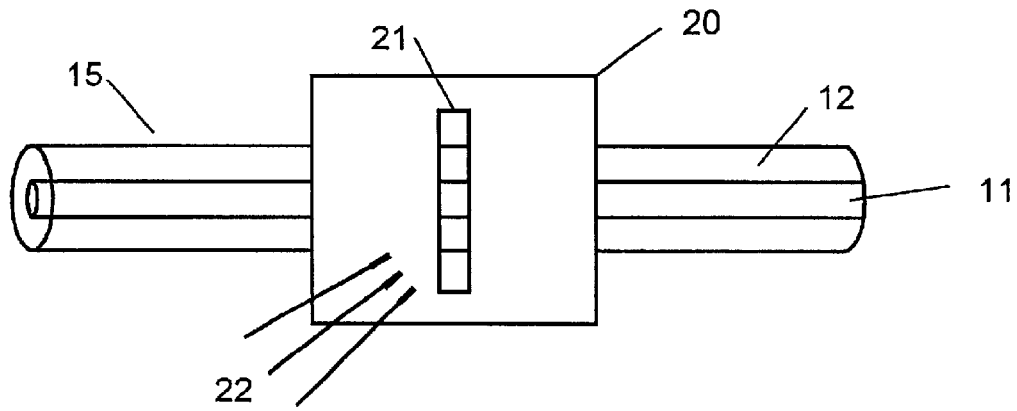
FIG. 1B and FIG. 1C show two ways to fabricate fiber gratings.
Figure 1C:
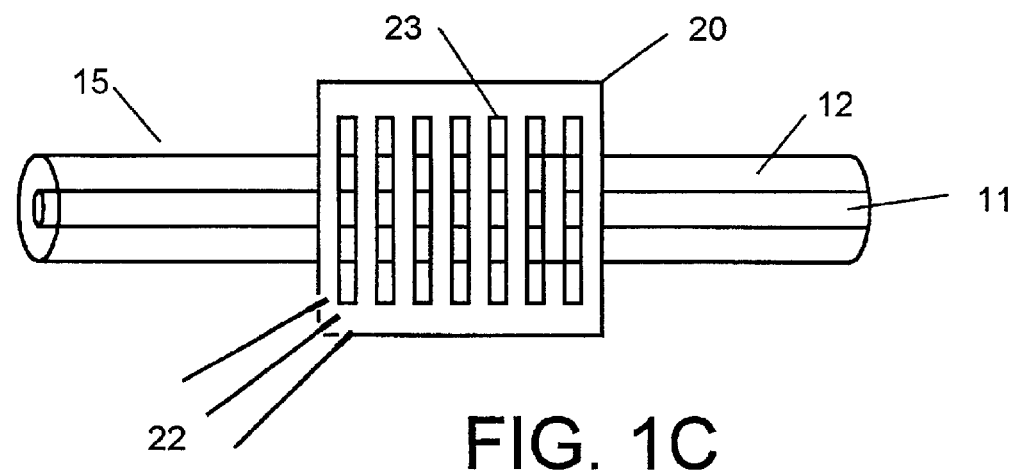

In FIG. 1A, the grating has a refractive index variation 10, which varies from the refractive index of the core, inside the core 11 of a single-mode fiber 15. In the preferred embodiment, the refractive index variations 10 have a periodicity of $\Lambda$ and form an angle $\theta$ 13 with respect to the longitudinal fiber axis 25. This type of structure is called a "slanted" grating. In a conventional optical fiber grating, the refractive index variation 10 is uniform within the slanted grating and within "unslanted" gratings, i.e., gratings that are perpendicular with respect to the centerline. In other words, the variation of the refractive index of the core is uniform for all values of $\Psi$ angular rotations about centerline 25 in the plane of the refractive index variation 10. In the preferred embodiment, the refractive index variation 10 is rotationally non-uniform in the plane defining the refractive index variation. For the purposes of this disclosure azimuthal angles and rotations are measured in the plane defined by the refractive index variation. In the embodiment illustrated in FIG. 1A, there is no index perturbation in the fiber cladding-region 12. A method of developing these gratings is via direct illumination of the fiber by a UV excimer laser. In FIG. 1B, the fiber 15 comprised by the cladding region 12 and the core region 11 is illuminated by the laser beam 22. The amplitude mask 20 controls the shape of the laser beam incident upon the fiber. The laser is turned on and laser-light passes through the slit 21 and impinges on the fiber. After the laser is turned off, the fiber 15 is then translated by distance $\Lambda$ and then the laser is turned on again. The same process is repeated many times such that the formed grating has the desired number of periods $\Lambda$. In an alternative approach shown in FIG. 1C, the amplitude mask 23 has several thin slits and an interference intensity pattern impinges the fiber. This method can be used for the development of short-period fiber Bragg gratings.

Figure 2:
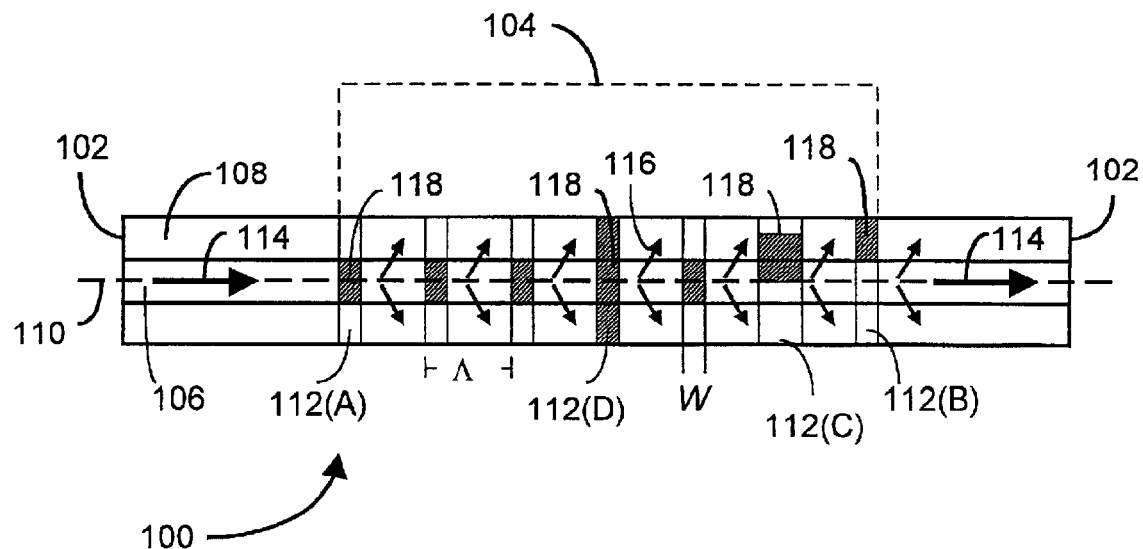
FIG. 2 shows a schematic view of an optical fiber having a grating region disposed there.

Referring to FIG. 2, the optical fiber 100 is a conventional single-mode optical fiber used in transmitting light signals in a network, such as a telecommunications network. Light is transmitted through the optical fiber 100 in a guided mode through the core 106, the core having a refractive index, $n_{core}$, greater than the refractive index, $n_{cladding}$, of the cladding 108. Although the core 106 has been illustrated as a single region having symmetry about the centerline 110, those skilled in the art are familiar with cores that have a plurality of concentric annular regions disposed therein, non-limiting examples of which are dispersion shifted optical fibers. The scope of the invention includes cores that have a generally uniform index of refraction and cores that have a plurality of regions with differing indices of refraction.

In one embodiment, the optical fiber 100 is a glass optical fiber. Those skilled in the art recognize that there are many glass optical fibers such as fluoride glass, doped glasses, and co-doped glasses. Examples of dopants used in glass optical fibers include, but are not limited to, germanium, boron, and hydrogen. Furthermore, optical fibers are also made from plastic materials and/or polymer materials, and are also included within the scope of the invention. Most, if not all, optical fibers having cores and/or claddings in which the magnitude of the refractive index of the core/claddings can be irreversibly or reversibly changed are intended to be included within the scope of the present invention.

Referring to FIG. 2, the optical fiber 100 includes one or more fiber gratings 104, each comprising a plurality of grating elements 112 of width W. For the purposes of this disclosure, a grating element 112 is generally a planar portion of width W of the optical fiber 100. The grating element 112 includes a perturbation 118 in the index of refraction of the optical fiber. The perturbation 118 can be in the index of refraction of the core 106, as shown for grating element 112(A), or in the cladding 108, as shown for the grating element 112(B), or the perturbation can extend from the core 106 into the cladding 108, as shown for the grating element 112(C), or the perturbation can extend across the width of the optical fiber 100, as shown for the grating element 112(D). Although the grating elements 112 are generally shown as being of uniform width, it should be noted that this is for illustrative purposes only and that the width of each perturbation can vary. For example, the grating elements 112(C) is illustrated as having a width that is twice the width of grating element 112(A). In addition, the width of the perturbation can be non-uniform, for example, wide at one place and narrow in another part of the grating element. The width of the grating element is such that two generally parallel planes separated by a width W surround the perturbation.

It should also be noted that although the grating elements 112 are illustrated as being generally parallel to each other and generally perpendicular to centerline 110 that this configuration is for illustrative purposes. In an alternative embodiment, the grating elements 112 are obliquely aligned with respect to the centerline 110. In yet another embodiment, the grating elements are obliquely aligned with respect to each other.

In a short-period fiber Bragg grating, the spacing between the grating elements 112 which is typically in the range 0.1 to 15 microns is chosen to shift the transmitted light in the region of the selected wavelength, $\lambda_p$, from the forward core-guided mode 114 into a backward core-guided or backward cladding mode. Thereby, reducing the intensity of the light, centered about $\lambda_p$, transmitted through the core 106.

In an LPFG, the spacing between the grating elements 112 which is typically in the range 15 to 1,500 microns is chosen to shift the transmitted light in the region of the selected wavelength, $\lambda_p$, from the forward core-guided mode 114 into a forward cladding mode. Thereby, reducing the intensity of the light, centered about $\lambda_p$, transmitted through the core 106.

In the preferred embodiment, the fiber grating 104 is a LPFG having grating elements 112 that are separated with a periodicity of $\Lambda$ and a width, W, that is typically in the range of $(1/10)\Lambda<W<(9/10)\Lambda$. The width of the perturbation in the refractive index defines the width, W, of the grating element 112. Generally, the perturbation in the refractive index varies smoothly across the width of the grating element and the variation can be represented as a Gaussian shape or other shape. It should be noted that the periodicity and the width are design parameters, and those skilled in the art will recognize the periodicity, $\Lambda$, and/or width, W, can be adjusted to fit design considerations.

Figure 3:
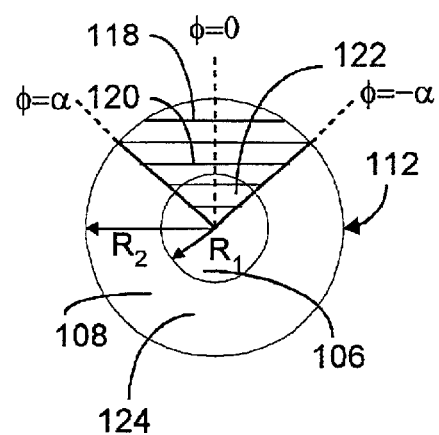
FIG. 3 is a cross sectional view of a grating element.

Refer now to FIG. 3, which shows a cross-sectional view of an exemplary grating element 112, the core 106 is generally cylindrical and centered around the centerline 110 (not shown) and has a radius of $R_1$, and the cladding 108 is generally annular with an inner radius of $R_1$ and an outer radius of $R_2$. In the preferred embodiment the grating element 112 is azimuthally varying about the centerline 110. The grating element 112 includes a perturbation 118, which includes cladding perturbation 120 and core perturbation 122 and an unperturbed region 124. The index of refraction at a point, given in polar coordinates $(r,\phi)$, in the grating element 112 can be given by the following equation:

$$n(r,\phi) = \begin{cases} n_{core}(r,\phi), & 0 < r \le R_1, \alpha < \phi \le 2\pi - \alpha \\ n_{core}(r,\phi) + \Phi_1(r,\phi), & 0 < r \le R_1, -\alpha < \phi \le \alpha \\ n_{cladding}(r,\phi), & R_1 < r \le R_2, \alpha < \phi \le 2\pi - \alpha \\ n_{cladding}(r,\phi) + \Phi_2(r,\phi), & R_1 < r \le R_2, -\alpha < \phi \le \alpha \end{cases}$$

where the perturbation in the core and the cladding is given by $\Phi_1$ and $\Phi_2$, respectively. The quantities $\Phi_1$ and $\Phi_2$ can be restricted to refractive index pertubations (phase change) or can be restricted to optical absorption pertubations. In the latter case, $\Phi_1$ and $\Phi_2$ represent perturbations in the imaginary part of the refractive index. In the general case, $\Phi_1$ and $\Phi_2$ can represent perturbations in both the real and imaginary parts of the refractive index. It should be noted that the pertubation in the core 106 may be different from, or the same as, the perturbation in the cladding 108.

In the simplest case, the index of refraction of the grating element 112 is given by the following equation:

$$n(r,\phi) = \begin{cases} n_{core}, & 0 < r \le R_1, \alpha < \phi \le 2\pi - \alpha \\ n_{core} + \Phi_1, & 0 < r \le R_1, -\alpha < \phi \le \alpha \\ n_{cladding}, & R_1 < r \le R_2, \alpha < \phi \le 2\pi - \alpha \\ n_{cladding} + \Phi_2, & R_1 < r \le R_2, -\alpha < \phi \le \alpha \end{cases}$$

where the core 106 and the cladding each have uniform index of refraction, and the perturbations in the core 106, $\Phi_1$, and the cladding 108, $\Phi_2$, are also uniform. However, even in the simplest case, the index of refraction varies as the azimuthal angle crosses the boundary between the perturbation region 118 and the unperturbed region 124.

Figure 4:
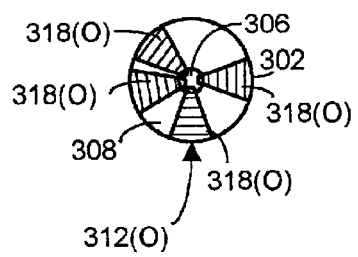
FIGS. 4A–4O are cross sectional views of exemplary grating elements.
Figure 4N:
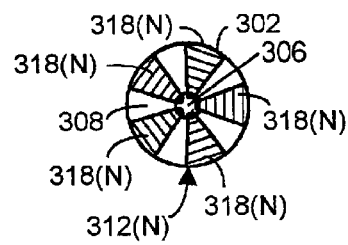
Figure 4M:
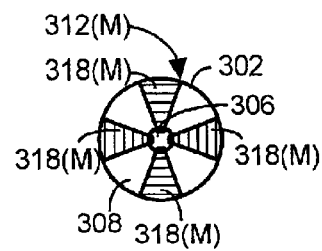
Figure 4L:
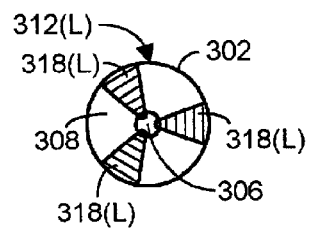
Figure 4K:
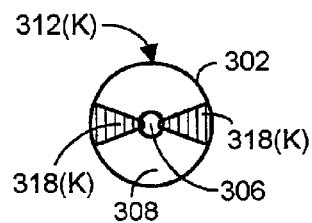
Figure 4J:
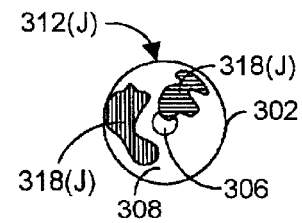
Figure 4I:
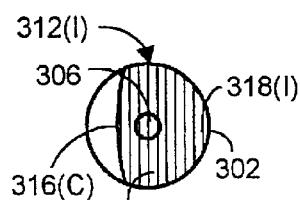
Figure 4H:
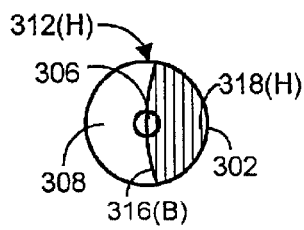
Figure 4G:
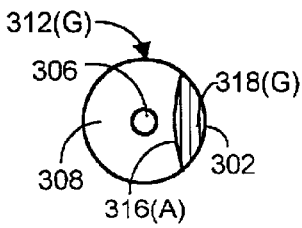
Figure 4F:
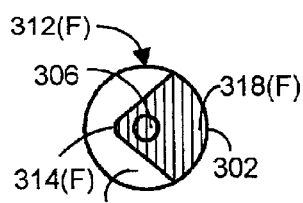
Figure 4E:
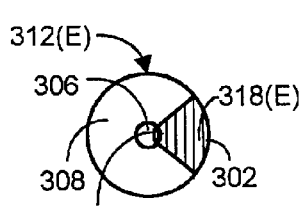
Figure 4D:
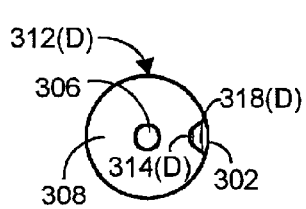
Figure 4C:
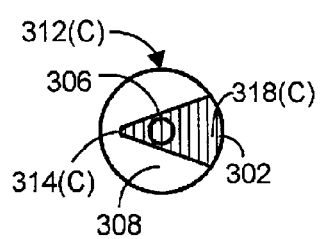

It should be noted that FIG. 3 is only an exemplary illustration of an embodiment of the invention. Other, non-limiting examples of grating elements having azimuthal asymmetry are illustrated in FIGS. 4A–4O. Briefly described, the grating elements 312(A), shown in FIG. 4A, includes a perturbation 318(A) that extends generally inward from the outer surface 302 into the cladding 308. The perturbation 318(A) is relatively small, extending only a portion of the way from the outer surface 302 towards the core 306, and is generally a pie shaped wedge having a generally acute angle at its vertex 314(A).

Figure 4B:
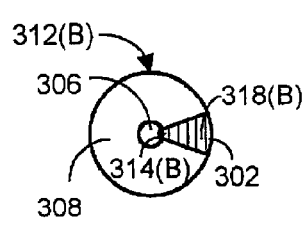
Figure 4A:
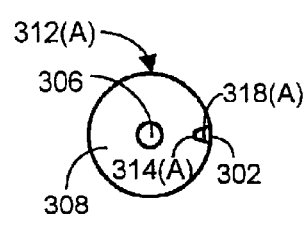

The grating element 312(B), shown in FIG. 4B, includes a perturbation 318(B) extending generally inward from the outer surface 302 into the core 306. The perturbation 318 is approximately pie shaped with an acute angle at its vertex 314(B).

The grating element 312(C), shown in FIG. 4C, includes a perturbation 318(C) extending generally inward from the outer surface 302 beyond the core 306 into the distal region of the cladding 308. The perturbation 318(C) is approximately pie shaped with an acute angle at its vertex 314(C).

The grating element 312(D), shown in FIG. 4D, includes a perturbation 318(D) that extends generally inward from the outer surface 302 into the cladding 308. The perturbation 318(D) extends from the outer surface 302 towards the core 306 and defines an acute angle, which is in the approximate range of 30 to 90 degrees at its vertex 314(D).

The grating element 312(E), shown in FIG. 4E, includes a perturbation 318(E) that extends generally inward from the outer surface 302 into the core 306. The vertex 314(E) of the perturbation 318(E) has an acute angle, which is in the approximate range of 30 to 90 degrees.

The grating element 312(F), shown in FIG. 4F, includes a perturbation 318(F) that extends generally inward from the outer surface 302 beyond the core 306 into the distal region of the cladding 308. The vertex 314(F) of the perturbation 318(F) defines an acute angle, which is in the approximate range of 30 to 90 degrees.

The grating element 312(G), shown in FIG. 4G, includes a perturbation 318(G) that extends generally inward from the outer surface 302 and to the cladding 308. An arc 316(A), the center of which is not shown and which is outside of the grating element 312(G), defines the perturbation 318(G).

The grating element 312(H), shown in FIG. 4H, includes a perturbation 318(H) that extends generally inward from the outer surface 302 into the core 306. An arc 316(B), the center of which is not shown and which is outside of the grating element 312(H), defines the perturbation 318(H).

The grating element 312(I), shown in FIG. 4I, includes a perturbation 318(I) that extends generally inward from the outer surface 302 past the core 306 and into the distal region of cladding 308. An arc 316(C), the center of which is not shown and which is outside of the grating element 312(I), defines the perturbation 318(I).

The grating element 312(J), shown in FIG. 4J, includes at least one perturbation 318(J). The perturbation 318(J) can be of any arbitrary shape and size and can be located anywhere in the grating element 312(J), provided the azimuthal symmetry about the center of the core is broken. It should be noted that if the perturbation 318(J) extends across the entire grating element 312(J), then the perturbation 318(J) has azimuthal asymmetry, otherwise, the perturbation could be uniform. In the preferred embodiment, the perturbation 318(J) has azimuthal asymmetry about the center of the core 306.

The grating elements 312(K), shown in FIG. 4K, includes a pair of generally pie shaped perturbations 318(K) extending generally inward from the outer surface 302 into the core 306. The perturbation is 318(K) are approximately linearly aligned.

The grating element 312(L), shown in FIG. 4L, includes three generally pie shaped perturbations 318(L), each perturbation 318(L) extends generally inward from the outer surface 302 into the core 306. The perturbations 318(L) are approximately equally spaced from each other.

The grating element 312(M), shown in FIG. 4M, includes four approximately pie shaped perturbations 318(M) each of which extends generally inward from the outer surface 302 into the core 306. The perturbations 318(M) are approximately equally spaced from each other.

The grating element 312(N), shown in FIG. 4N, includes five approximately pie shaped perturbations 318(N), each of which extends generally inward from the outer surface 302 into the core 306. The perturbations 318(N) are approximately equally spaced from each other.

The grating element 312(O), shown in FIG. 4O, includes four approximately pie shaped perturbations 318(O), each of which extends generally inward from the outer surface 302 into the core 306. In contrast to FIGS. 4K through 4N, the perturbations 318(O) are not approximately equally spaced from each other.

It should be noted that the grating elements 312 are non-limiting examples of embodiments of the grating elements having azimuthal asymmetry. All grating elements having azimuthal asymmetry are intended to be within the scope of the invention.

Figure 5:
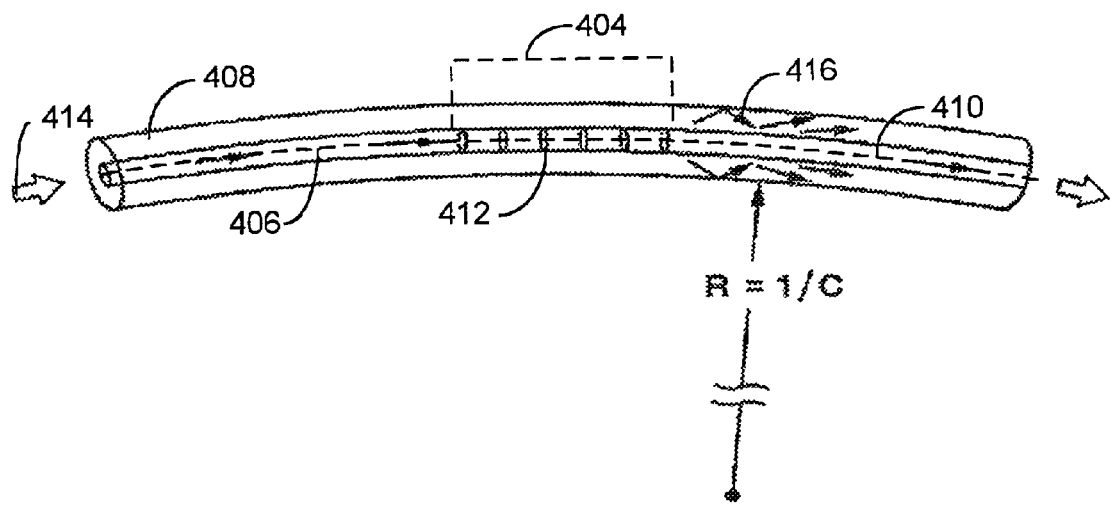
FIG. 5 shows a bent optical fiber having a grating region disposed therein.

Referring now to FIG. 5, an optical fiber 400 having a fiber grating 404, which includes a plurality of azimuthally varying grating elements 412, is configured such that the centerline 410 is curved. In this example, the optical fiber 400 is bent into an arc having an arbitrary radius of curvature. Generally, the optical characteristics, such as the coupling between core mode 414 which propagates into the fiber core and cladding mode 416, of the fiber grating 404 are a function of the alignment of the azimuthally varying grating elements 412. The coupling between the core mode 414 and the cladding mode 416 can be tuned by changing the relative orientation of the azimuthally varying grating elements 412. It will be demonstrated hereinbelow that with appropriately bending of the fiber grating 404 the coupling between the core modes 414 and the cladding modes 416 can be tuned at desired frequencies.

Although FIG. 5 illustrates changing the optical path by smoothly bending the optical fiber, any method of changing the relative orientations of the grating elements including but not limited to, kinking, micro-bending, are intended to be included within the scope of the invention. Furthermore, when the optical fiber grating 404 is axially twisted about centerline 410, the relative orientations of the perturbations in the grating elements 412 are changed. Consequently, the fiber grating 404 can be tuned to couple to desired frequencies with appropriate twisting of the fiber grating 404. The coupling between modes can also be tuned by a combination of rotation of the optical fiber 400 and deformation of the fiber grating 404.

Figure 6:
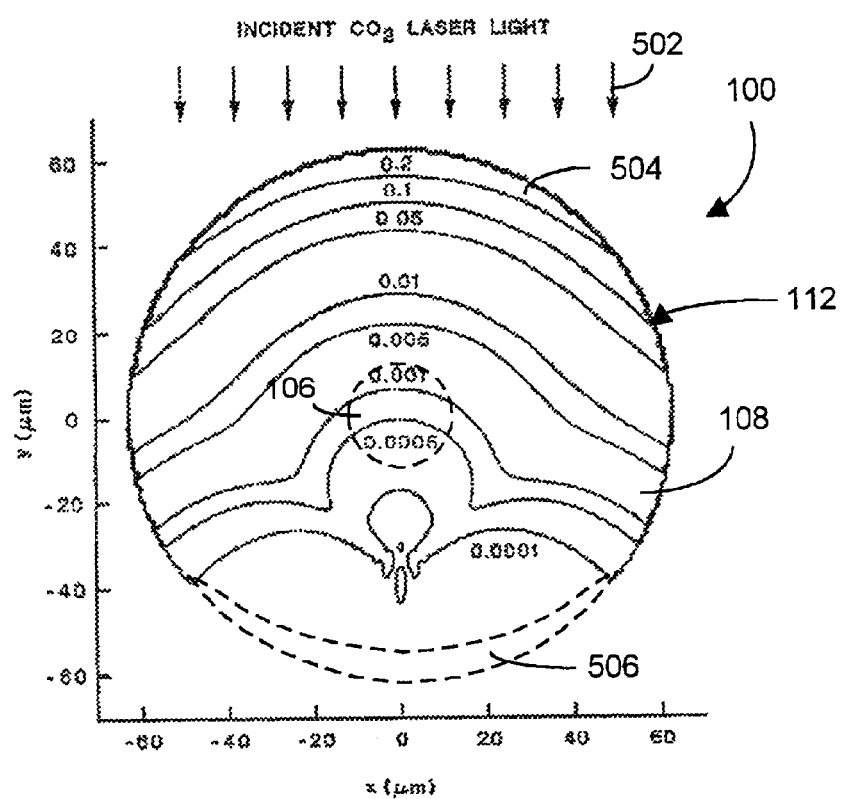
FIG. 6 shows a cross sectional view of normalized intensity of a transversely applied beam in an optical fiber.

Referring to FIG. 6, in one embodiment, an azimuthally varying grating element 112 is produced by illuminating a portion of an optical fiber 100 by a laser beam. To make the grating element 112, incident light 502 of intensity $I_0$ is transversely applied to a region of the optical fiber 100. The wavelength of the incident light is chosen such that it is highly absorbed by optical fiber 100, thereby heating the region of the optical fiber 100 that absorbs the incident light 502. An amplitude mask can be used with one slit or multiple slits to control the light pattern impinging on the fiber.

FIG. 6 also represents simulated results of normalized incident light intensity in optical fiber 100. In this experiment optical fiber 100 is a standard telecommunications matched-clad glass fiber and the incident light is a laser beam from a $CO_2$ laser. Details of this simulation can be found in "Axial Rotation Dependence of Resonances in Curved $CO_2$—Laser-Induced Long-Period Fibre Gratings," Electronic Letters, vol. 36, pp. 1354–1355, Aug. 3, 2000, which is hereby incorporated by reference.

For the purposes of this disclosure, we shall define a top surface region 504 as being the portion of the grating element 112 in which the normalized intensity is approximately between 0.2 and 1, and we shall define a bottom surface region 506 as being the portion of the grating element 112 that is radially distal from the top surface region 504. Clearly, almost all of the incident light is absorbed by the optical fiber 100 within approximately 20 microns from the incident surface. The incident light 502 is used for creating a temperature gradient between the upper surface 504 and the bottom surface 506.

A perturbation in the refractive index of the optical fiber 100 is produced in the portion of the optical fiber 100 that is heated by the incident light 502. Generally, the magnitude of the perturbation in the refractive index is related to the temperature of the heated portion. Thus, the incident light 502 produces a grating element 112 having a given perturbation in the refractive index in the upper surface region 504 and a smaller perturbation in the bottom surface region 506. Likewise, the perturbation in the refractive index of the core 106 is generally greatest in the region of the core proximal to the top surface region 504 and least in the region distal from the top surface region 504. It is also understood that the magnitude of the refractive-index perturbation can be controlled by the laser beam intensity.

While the top surface region 504 absorbs more energy than does the bottom surface region, the absorption is generally symmetric about a vertical line (not shown) at x=0. Thus, when the optical fiber 100 is initially symmetric about a vertical line at x=0, the perturbation in the refractive index caused by heating from incident laser light 502 is also symmetric about a vertical line at x=0, and consequently, the optical characteristics of the grating element 112 are symmetric about a vertical line at x=0.

In the preferred embodiment, a first grating element 112 of the fiber grating 104 is produced by applying the incident light 502 to a portion of the optical fiber for a predetermined duration and at a predetermined intensity. A subsequent grating element, which is a predetermined distance from the first grating element, is produced by applying the incident light 502 for a predetermined duration and intensity to a subsequent portion of the optical fiber 100. In the preferred embodiment, the optical fiber 100 is positioned in a given orientation relative to the incident laser beam and the relative orientation of the top surface region 504 for each subsequent grating element 112 is predetermined.

Although, the preferred embodiment uses a $CO_2$ laser as a heat source to produce the azimuthally varying grating elements 112 in the optical fiber 100, other embodiments include but are not limited to heat sources such as plasma arcs, ultraviolet lasers, visible lasers, narrow flames, etc.

In another embodiment, azimuthally varying grating elements are produced by including dopants, such as, but not limited to, germanium, boron, and hydrogen in optical fiber 100 and exposing the dopants to light sources, such as an UV laser. In this embodiment, during the fabrication of the optical fiber 100, the dopants are disposed in the optical fiber according to a predetermined or a random azimuthally varying pattern, non-limiting examples of which are shown in FIGS. 4A–4O. It is to be understood that a plurality of dopants can be disposed in a azimuthally varying grating element. In one embodiment, a first region has a first dopant disposed therein and a second region has a second dopant disposed therein. In another embodiment, a plurality of dopants are disposed in a region of the azimuthally varying grating element. In yet another embodiment, a dopant or a plurality of dopants are disposed in one or several regions of the azimuthally varying grating element and the concentration of the dopant or dopants is varied.

Figures 7A, 7B:
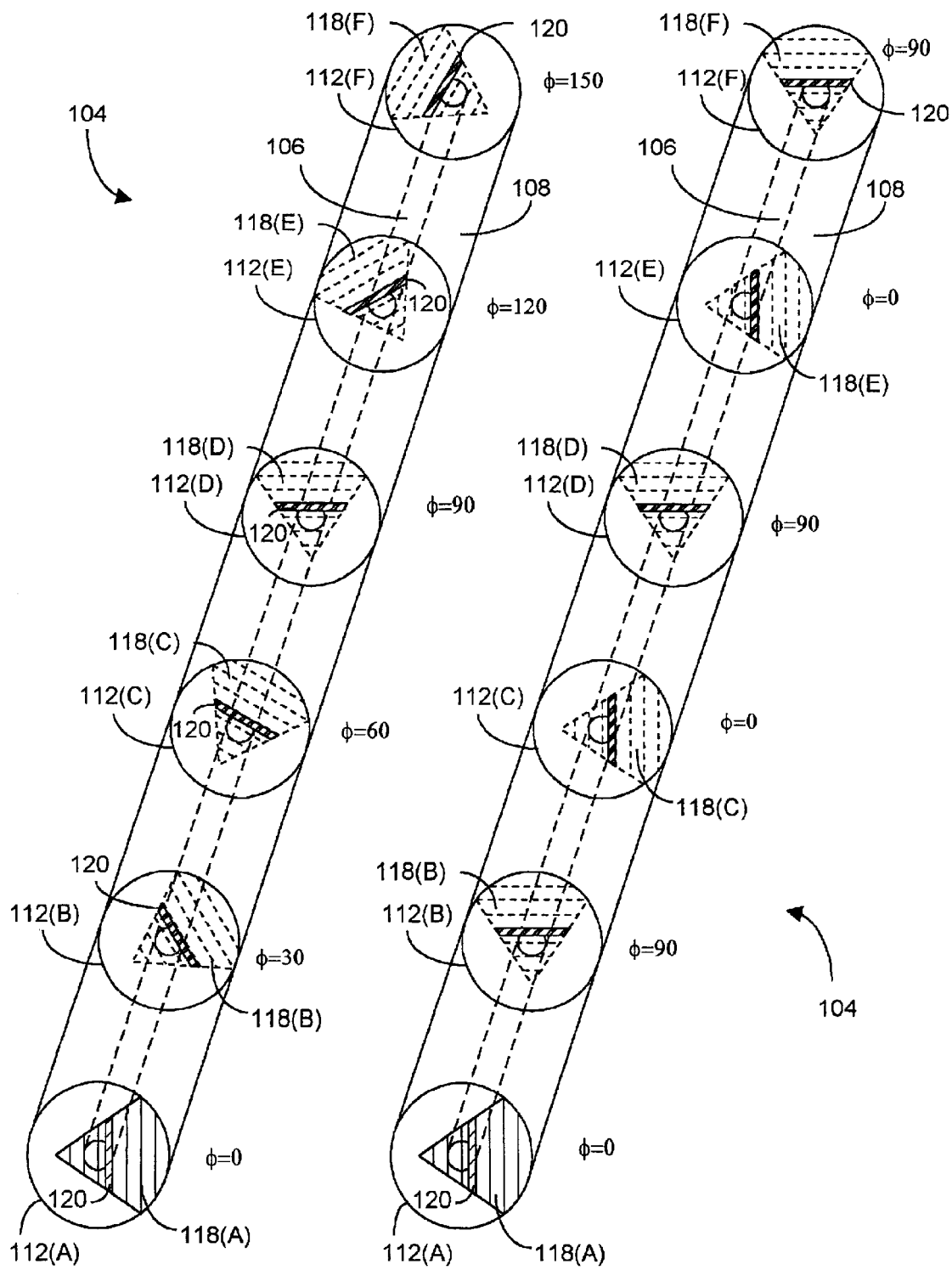
FIGS. 7A and 7B show exemplary grating element configurations.

Typically, the grating elements 112 are configured such that each top surface region 504 is approximately linearly aligned. In alternative embodiments, the top surface regions 504 of the grating elements 112 are aligned according to a predetermined scheme. Non-limiting examples of two alignment schemes are shown in FIGS. 7A and 7B. In FIG. 7A, fiber grating 104 includes a plurality of grating elements 112(A)–112(F). In this exemplary fiber grating 104, the grating elements 112 are rotationally aligned such that each grating element is offset by a predetermined amount. For example, grating elements 112(B) is azimuthally rotated about the centerline (not shown) by 30 degrees relative to the orientation of the grating element 112(A). In this example, except for being rotated with respect to each other, the grating elements are essentially the same. All of the perturbations 118 were produced by absorbing essentially the same amount of energy, with each incident top surface region being rotationally offset. Thus, equivalent portions of the grating elements are rotationally offset. For example, region 120 of the perturbation 118 is essentially the same in each grating element 112. It should be clear that the amount of rotation of each grating element 112 is a design choice, and that each grating element 112 need not be rotated by a multiple of a predetermined amount. For example, the grating element 112(B) could be rotated by 11 degrees and the grating elements 112(C) could be rotated by 60 degrees relative to grating element 112(A).

In FIG. 7B, the grating elements 112(of exemplary fiber grating 104 are periodically rotationally offset. In this example, grating elements 112(B), 112(D) and 112(F) are rotationally offset by 90 degrees with respect to grating elements 112((A), 112(C) and 112(E). It should be clear that the amount of rotation is a design choice, as is the periodicity of the rotated gratings. For example, in another embodiment, the grating elements could be grouped into three sets, each of the three sets having different rotational orientation.

Referring now to FIGS. 8–12, shown are transmission characteristics of two exemplary LPFG (LPFG). The two exemplary LPFG's were fabricated period by period using carbon dioxide laser pulses. Gratings were written into standard matched-clad single-mode fiber (Corning SMF 28) with no hydrogen loading or special treatment of any kind. The experimental configuration, details of which can be found in "Tuning, Attenuating, and Switching by Controlled Flexure of Long-Period Fiber Gratings," Optics Letters, vol. 25, pp. 61–63, Jan. 15, 2001, which is incorporated herein by reference, included a computer-controlled translation stage that positioned the fibers so that single pulses of $CO_2$ laser light of 10.6 $\mu$m wavelengths could be focused onto the fiber at desired positions along the fiber axis. The grating period, $\Lambda$, was 480 $\mu$m. For LPFG No. 1, the number of periods, N, was 40 and the incident writing energy was 88 mJ/period (0.40 watts for 0.22 seconds). For LPFG No. 2, the number of periods, N, was 50 and the incident writing energy was 100 mJ/period (0.40 watts for 0.25 seconds). The transmission spectra of these LPFG's were measured from 1000 nm to 1600 nm using an optical spectrum analyzer (Hewlett Packard Model 70951B). For the measurements presented herein the fibers containing the LPFG's were placed on top of a horizontal plastic optical fiber platform and held there under slight tension (a tensile force of 25 milli-Newtons). Beneath the horizontal plastic optical fiber platform, at approximately the center, a micropositioner was used to deflect upwardly the plastic optical fiber platform and the LPFG's, which were correspondingly flexed as shown in FIG. 4. The radius of curvature could be varied from R=infinity to 0.2 meters (curvature varied from C=1/R=0 $m^{-1}$ to 5 $m^{-1}$).

Figure 8:
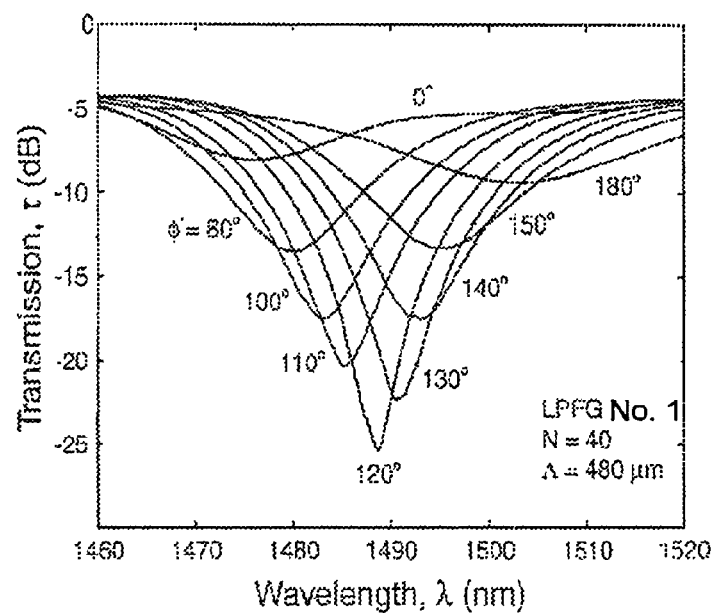
FIG. 8 shows rotational dependence of the transmission characteristics of a grating region that includes grating elements, which were written into the optical fiber by a $CO_2$ laser beam.

Referring now to FIG. 8, shown is the transmission characteristic for the long period optical fiber grating number 1 having 40 grating elements 112 (with a periodicity of 480 $\mu$m. FIG. 8 demonstrates the strong dependence of the transmission on the axial rotational orientation of the optical fiber 100, where $\phi'$ denotes the azimuthal rotation of the optical fiber from the configuration illustrated in FIGS. 7A–7B. The grating elements had the same general azimuthal symmetry as the grating element shown in FIG. 6. From symmetry arguments, the transmission at $\phi'=90°$ and $\phi'=270°$ should be the same and this was observed experimentally to a close approximation. The diffraction of the core modes 114 into the cladding modes 116 as illustrated by transmission magnitude, $\tau$, is sensitive to the axial rotational orientation of the fiber.

The strong axial rotation orientation dependence observed in $CO_2$ laser induced LPFG's provides an important additional degree of freedom for tailoring the transmission characteristics of wavelength tuners, attenuators, switches, and modulators. This degree of freedom is not present in symmetric gratings, such as conventional UV induced grating. By proper choice of axial rotation angle A, desired characteristics such as wavelength tuning at constant attenuation and variable attenuation at constant wavelength can be achieved.

Figure 9:
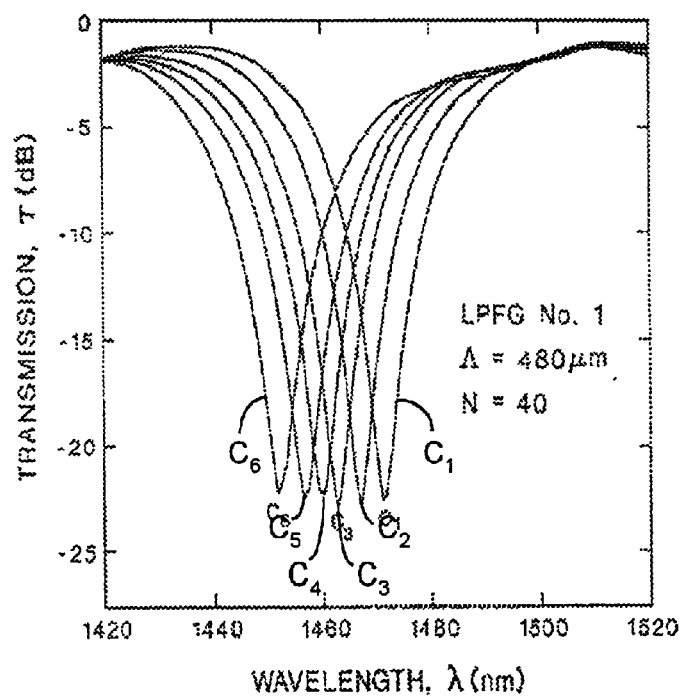
FIG. 9 shows transmission spectral characteristics with bending curvature as a parameter for a glass optical fiber having a grating region that includes grating elements, which were written into the optical fiber by a $CO_2$ laser beam.
Figure 10:
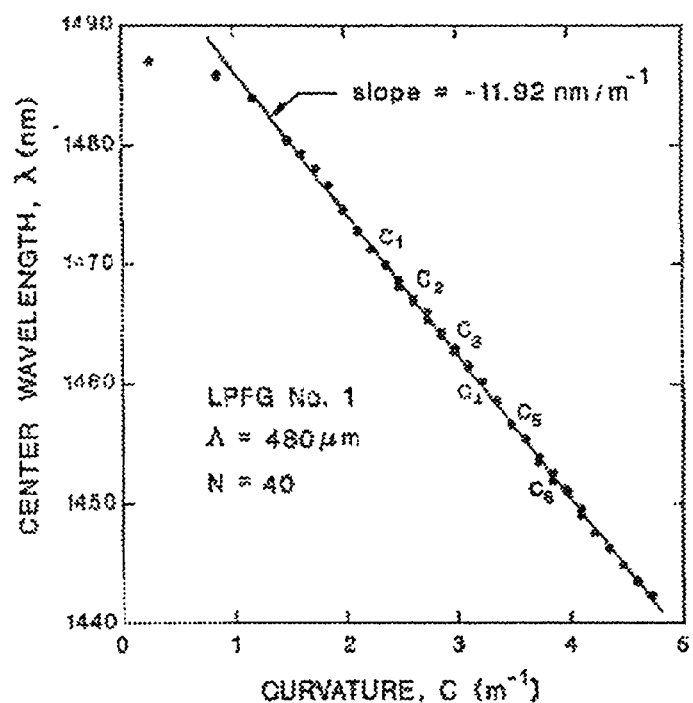
FIG. 10 shows the center wavelength as a function of bending curvature for a glass optical fiber having a grating region that includes grating elements, which were written into the optical fiber by a $CO_2$ laser beam.

Referring now to FIGS. 9–12, six to ten distinct resonances were typically observed in the wavelength range from 1,000 to 1,600 nanometers. Varying the curvature, C, of the LPFG's caused the resonance to change both in attenuation and in wavelength. Also, the resonance changed significantly with axial rotation of the fiber. Consequently, the evolution of the resonance with increasing curvature depends sensitively on the axial orientation of the LPFG with respect to the plane of curvature. Orienting LPFG No. 1 appropriately on the flexing optical fiber platform enabled wavelength tuning at a constant attenuation as shown in FIG. 9. In this particular case, an attenuation of 21 dB was tuned over a wavelength range of 20 nanometers from 1,472 nanometers to 1,452 nanometers by changing the curvature of the LPFG No. 1 from $C_1=2.23$ $m^{-1}$ to $C_6=3.85$ $m^{-1}$, thereby demonstrating constant attenuation tuning with an LPFG. The radius of curvature for each of the labeled curves shown in FIGS. 9 and 10, are given in Table 1.

TABLE 1

Bending curvatures for optical characteristics shown in FIGS. 9 and 10.

| $C_1$ | $C_2$ | $C_3$ | $C_4$ | $C_5$ | $C_6$ |
| --- | --- | --- | --- | --- | --- |
| 2.23 $m^{-1}$ | 2.61 $m^{-1}$ | 2.98 $m^{-1}$ | 3.23 $m^{-1}$ | 3.48 $m^{-1}$ | 3.85 $m^{-1}$ |

The six transmission spectra shown in FIG. 9 are representative of the spectra for the 30 curvatures applied. The tuning of the center wavelength with curvature is shown in FIG. 10. A total of 38 spectra are summarized in FIG. 10.

The wavelength tuning is linear with curvature and has a tuning sensitivity of 11.92 nanometers/m$^{-1}$ over most of the range. It should be noted that the transmission increases (attenuation decreases) at the high and low curvature ends for the 30 curvatures shown in FIG. 10.

Figure 11:
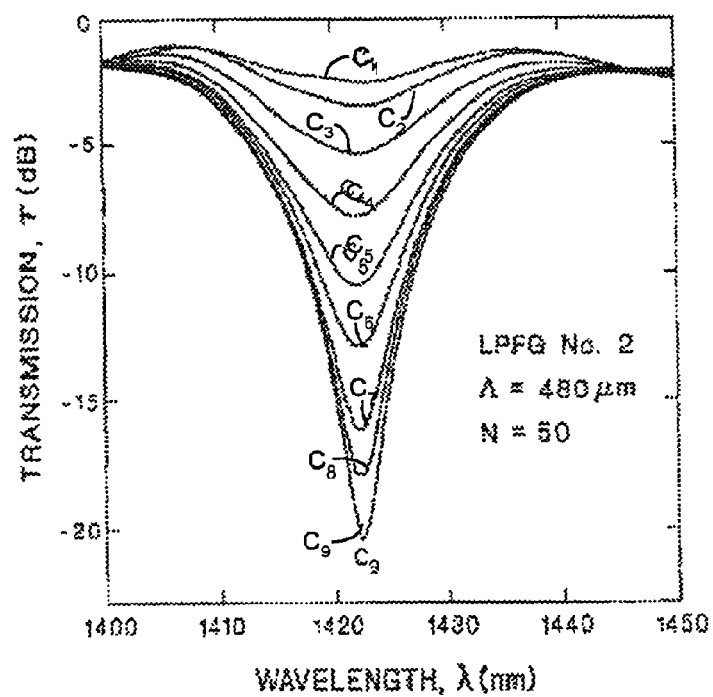
FIG. 11 shows transmission spectral characteristics with bending curvature as a parameter for a glass optical fiber having a grating region that includes grating elements, which were written into the optical fiber by a $CO_2$ laser beam.
Figure 12:
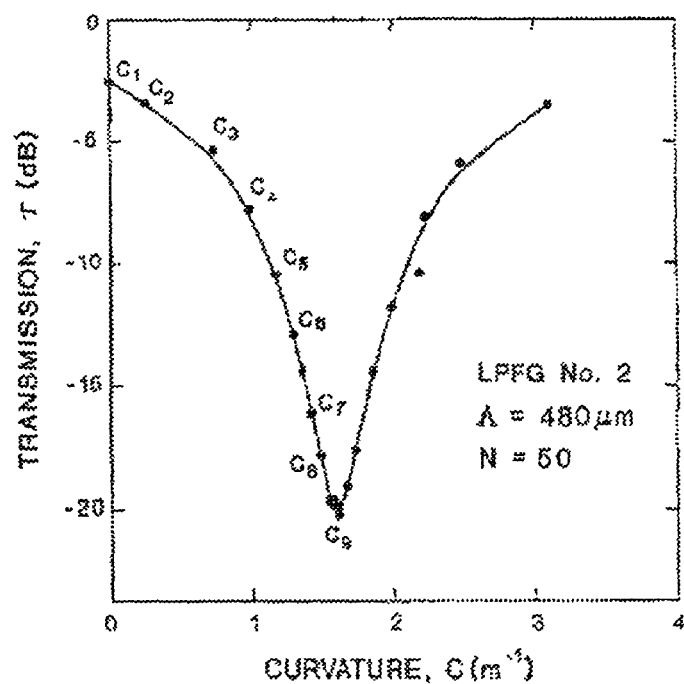
FIG. 12 shows the transmission spectral characteristics as a function of bending curvature for a glass optical fiber having a grating region that includes grating elements, which were written into the optical fiber by a $CO_2$ laser beam.

Referring now to FIG. 11, shown are the transmission characteristics of an exemplary LPFG 2. The transmission characteristics demonstrate variable attenuation/switching/modulation at a constant wavelength by appropriate axial rotation of the LPFG No. 2 coupled with bending the LPFG No. 2. In this case, the attenuation at a wavelength of 1,422 nanometers was varied over a 19 dB range by changing the curvature of the LPFG No. 2 from $C_1=0.0$ m$^{-1}$ to $C_9=1.61$ m$^{-1}$. The radius of curvatures for $C_1$ through $C_9$, shown in FIGS. 11 and 12, are given in Table 2. The nine transmission spectra shown in FIG. 10 are representative of the spectra for 21 curvatures (a total of 22 spectra) applied in this experiment. The transmission (attenuation) as a function of curvature is shown in FIG. 11. As curvature was increased beyond $C_9=1.61$ m$^{-1}$ (overall minimum transmission) the transmission increased (attenuation decreased) as shown in FIG. 12. For axial orientations other than those used in FIGS. 9–12, both the wavelength and the transmission simultaneously change when the LPFG region was flexed. A wide variety of wavelength transmission characteristics were observed.

along the centerline. Using transverse interferometry, the relative index difference was measured on the side of the optical fiber upon which the laser beam was incident. The peaks in the relative index difference, which are about 0.05%, correspond to the grating elements and have the appropriate periodicity. The value of $n_o$ was 1.458, so the increase in the refractive index of the cladding region upon which the laser beam was incident upon was about $1.5\times10^{-3}$.

Although the experimental results given hereinabove were for LPFGs, it is to be understood that they were exemplary fiber grating, which were not intended to limit the scope of the invention. Other fiber gratings included in the scope of the invention include, but are not limited to, short-period fiber Bragg gratings. Other exemplary fiber gratings are shown in FIGS. 14A–14F.

Optical fiber grating 1300(A), shown in FIG. 14A, has a fiber grating 1304 disposed therein. The fiber grating 1304 includes a plurality of approximately equally spaced grating elements 1312 extending from the cladding into the core.

Optical fiber grating 1300(B), shown in FIG. 14B, has a pair of fiber gratings 1304(A) and 1304(B) disposed therein. Each fiber grating 1304 includes a plurality of approximately equally spaced grating elements 1312 extending from the cladding into the core. The periodicity of the grating elements 1312 included in the fiber grating element 1304(A) is approximately the same as the periodicity of the grating elements 1312 in the fiber grating 1304(B).

TABLE 2

Bending curvatures for optical characteristics shown in FIGS. 11 and 12.

| $C_1$ | $C_2$ | $C_3$ | $C_4$ | $C_5$ | $C_6$ | $C_7$ | $C_8$ | $C_9$ |
|---|---|---|---|---|---|---|---|---|
| 0.0 m$^{-1}$ | 0.25 m$^{-1}$ | 0.73 m$^{-1}$ | 0.98 m$^{-1}$ | 1.17 m$^{-1}$ | 1.29 m$^{-1}$ | 1.42 m$^{-1}$ | 1.48 m$^{-1}$ | 1.61 m$^{-1}$ |

As wavelength tuners (FIG. 9) and as variable attenuators/switches/modulators (FIG. 11), these grating devices have significant potential for application to fiber optic network telecommunications. A major advantage is that the modulating device is contained within the fiber as opposed to being external to the fiber. Piezoelectric, electromechanical or similar transducers, including but not limited to a microelectronic apparatus, mechanical-apparatus, an electromechanical solenoid, a linear motor, a stepping motor and mechanical cam, a hydraulic apparatus, a pneumatic apparatus, a thermomechanical apparatus, a photoelastic apparatus, an acoustic apparatus, a magnetostrictive apparatus, a electrostrictive apparatus, and a piezo-electric ceramic platform can be attached to the fiber to make the tuning, attenuation, switching, and modulation electrically controllable by controlling the positioning of the fiber. The wavelength tuning and variable attenuation effects can be applied in sensor applications, and other applications.

Figure 13:
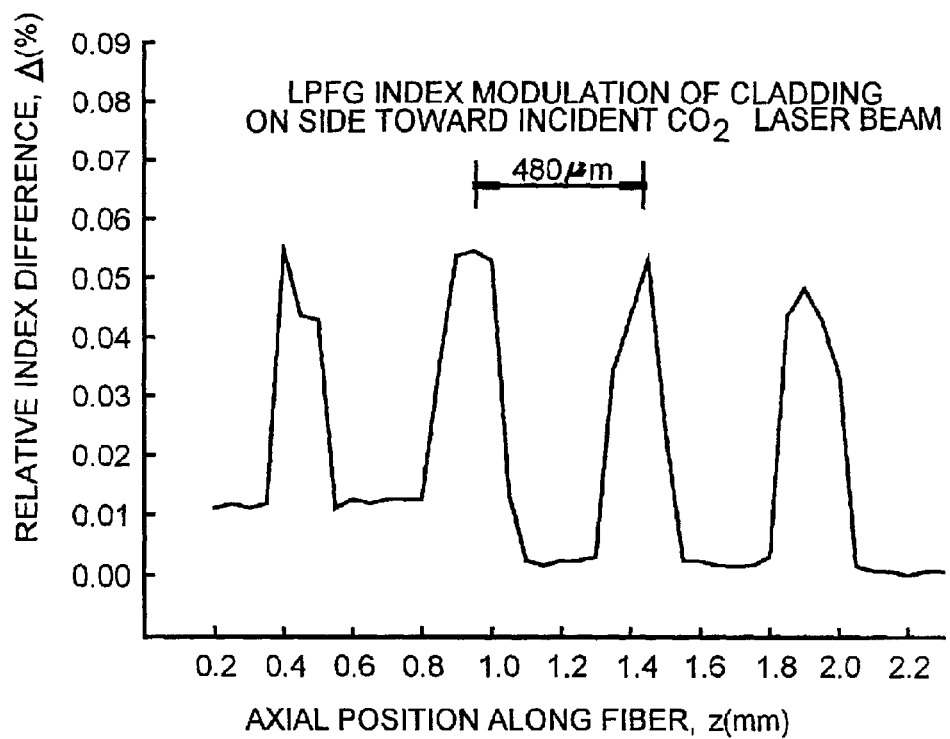
FIG. 13 shows longitudinal relative index difference in an optical fiber.

Referring now to FIG. 13, shown is a relative index difference profile for the cladding region of a hydrogen-loaded optical fiber that has had a plurality of grating elements with periodicity of 480 μm written into the optical fiber by a $CO_2$ laser. The horizontal is the axial direction of the optical fiber, and the vertical axis is the relative index difference, which is given by $$\Delta = [n(r,z) - n_0]/n_0,$$

where $n_0$ is the index of refraction of an index matching oil chosen to match the index of refraction of the unperturbed cladding region and where $n(r,z)$ is the index of refraction of the radial region measured from the centerline at positions Optical fiber grating 1300(C), shown in FIG. 14C, has a pair of fiber gratings 1304(c) and 1304(D) disposed therein. Each fiber grating 1304 includes a plurality of approximately equally spaced grating elements 1312 extending from the cladding into the core. The periodicity of the grating elements 1312 included in the fiber grating element 1304(D) is approximately greater than the periodicity of the grating elements 1312 in the fiber grating 1304(C). The difference in the periodicity is a design choice, as is the relative positions of fiber gratings 1304(C) and 1304(D).

Optical fiber grating 1300(D), shown in FIG. 14D, has a chirped fiber grating 1304 disposed therein, which includes a plurality of grating elements 1312 having non-uniform longitudinal spacing extending from the cladding into the core. The spacing between grating elements 1312 in fiber grating 1304 of optical fiber 1310(D) is a design choice. In an alternative embodiment, the spacing between grating elements can conform to any predetermined or random pattern.

Optical fiber grating 1300(E), shown in FIG. 14E, has a pair of chirped fiber gratings 1304(E) and 1304(F) disposed therein. Each fiber grating 1304(E) and 1304(F) includes a plurality of grating elements 1312 extending from the cladding into the core. The spacing of the grating elements 1312 included in the chirped fiber grating element 1304(E) is approximately the same as the spacing of the grating elements 1312 included in the chirped fiber grating 1304(F), and the spacing generally decreases from left to right in both of the fiber gratings, 1304(E) and 1304(F).

Optical fiber grating 1300(F), shown in FIG. 14F, has a pair of chirped fiber gratings 1304(G) and 1304(H) disposed therein. Each fiber grating 1304(G) and 1304(H) includes a plurality of grating elements 1312 extending from the cladding into the core. The spacing of the grating elements 1312 included in the chirped fiber grating element 1304(G) is approximately the same as the spacing of the grating elements 1312 included in the chirped fiber grating 1304(H). However, the spacing of the grating elements included in the chirped fiber grating 1304(G) decreases from left to right and the spacing of the grating elements 1312 included in the chirped fiber grating 1310(H) increases from left to right.

The embodiments shown in FIGS. 14A–14F are non-limiting examples of possible configurations of azimuthally varying grating elements. Other non-limiting configurations include, but are not limited to, disposing the azimuthally grating elements 1312 in a portion of the core or in a portion of the cladding or across the core and cladding.

Referring now to FIGS. 15A–15E, FIG. 15A is a side view of tuning/attenuating/switching/modulating fiber grating device 1400, hereinafter collectively referred to as "tuning device." Tuning device 1400 includes a housing 1402 having opposed ends 1404 that are adapted to be coupled to devices and/or fibers within an optical network. Extending between the opposed ends 1404 are opposed sidewalls 1406 that have bottom wall 1408 and top wall 1410 extending there between. Housing 1402 has a generally hollow interior extending between the opposed ends 1404.

Tuning device 1400 further includes, disposed within the generally hollow interior of the housing 1402, a tuning actuator 1412, a plurality of posts 1414, an optical fiber platform 1416 and an optical fiber 100 having opposed ends 102. The opposed ends 1404 of housing 1402 include aligned openings 1418 for receiving the opposed optical fiber ends 102. In the preferred embodiment, the openings are vertically aligned approximately half way between the bottom wall 1408 and the top wall 1410 and extending between the openings 1418 is optical fiber 100, which includes a plurality of azimuthally varying grating elements in the grating element 104. The openings 1418 are typically contained within standard commercial fiber optic connectors.

Figure 15A:
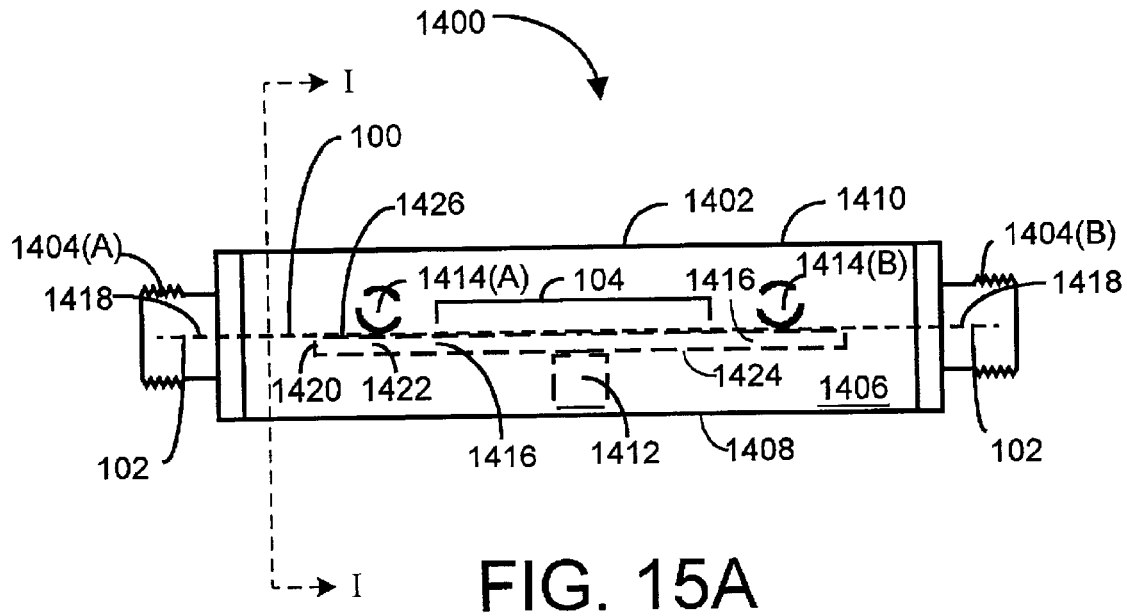
FIGS. 15A–15C show an exemplary device for configuring an optical fiber.
Figure 15C:
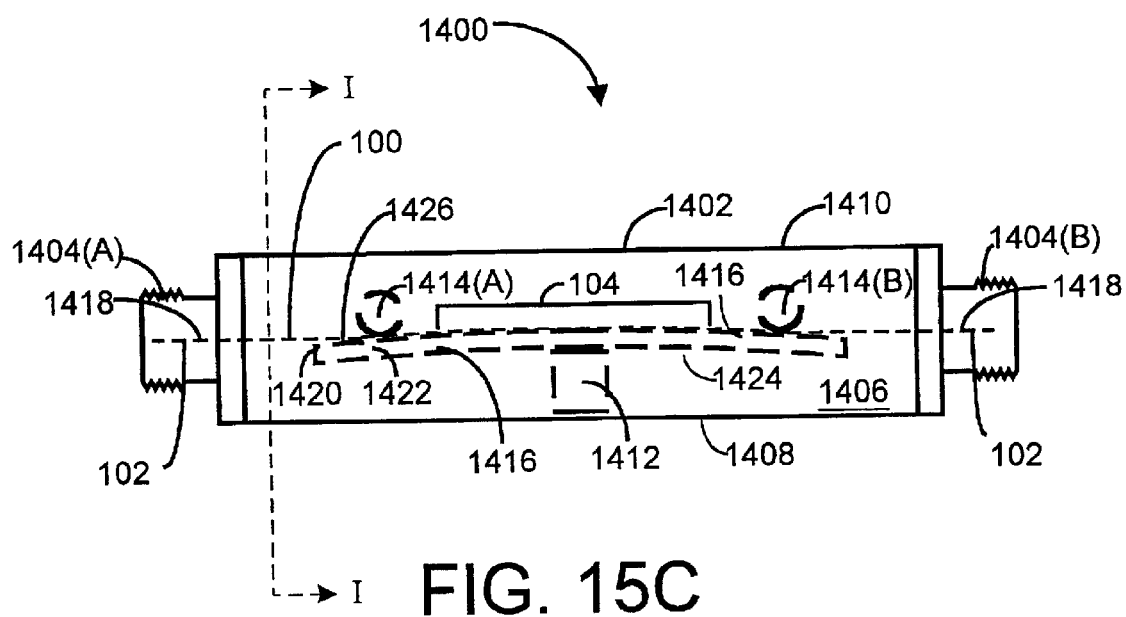
Figure 15B:
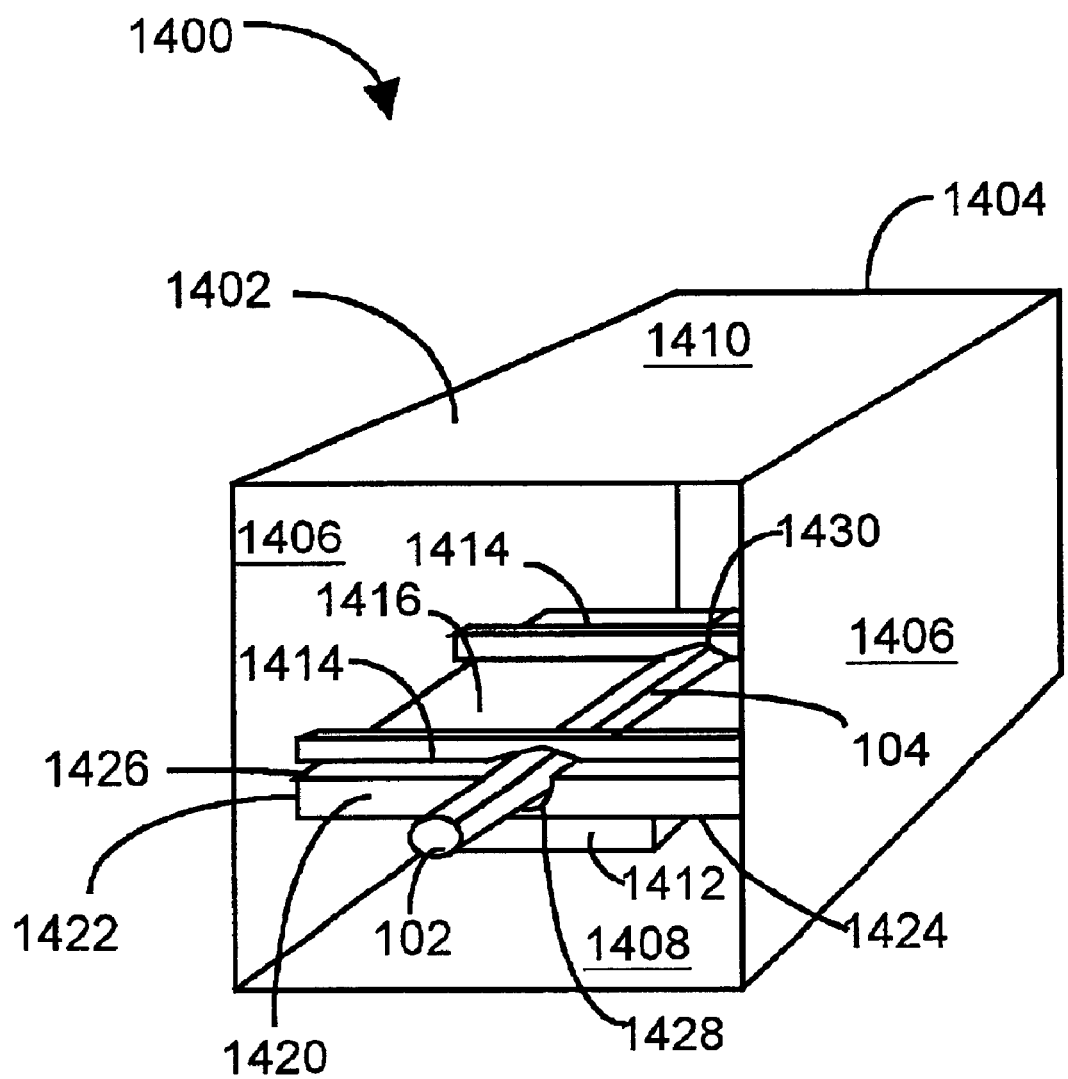

Referring now to FIG. 15B, shown is a cutaway prospective view of tuning device 1400, as seen when viewed along line I-I of FIG. 15A. Fixedly attached to the bottom wall 1408, approximately half way between opposed ends 1404 and extending at least partially between opposed sidewalls 1406, is tuning actuator 1412. Disposed on tuning actuator 1412 is optical fiber platform 1416, which in the preferred embodiment is generally a rectangular sheet of resilient material such as plastic or metal defined by opposed ends 1420 and opposed sides 1422, for positioning the optical fiber. The optical fiber platform 1416 further includes a bottom surface 1424, which engages tuning actuator 1412, and a generally flat top surface 1426 that has a generally V-shaped groove 1428 formed therein. The V-shaped groove 1428 extends between opposed platform ends 1420 and is aligned with optical fiber 100, which is disposed therein. In the preferred embodiment, each of the posts includes a generally V-shaped groove 1430 for receiving a portion of the optical fiber 100. The generally V-shaped grooves formed in the posts 14141 are aligned with the platform V-shaped groove 1428, straddling the optical fiber 100, and the optical fiber 100 is affixed to the optical fiber platform 1416, proximal to opposed platform ends 1420, by means such as adhesive. In an alternative embodiment, the optical fiber 100 is disposed directly on the tuning actuator 1412, thus the tuning actuator can also be used for positioning the optical fiber 100 in a given orientation between opposed ends 1404 of housing 1402 and for flexing or bending the optical fiber 100.

Rigidly affixed to sidewalls 1406 and extending therein, are the plurality of posts 1414 made from a rigid material such as metal or hard plastic. The posts are vertically aligned such that the posts engage the top surface 1426 of the optical fiber platform 1416 proximal to the opposed platform ends 1420.

Referring now to FIGS. 15A and 15C, the optical fiber 100 is disposed in the groove of the optical fiber platform 1416 and fixedly attached thereto, such that the grating region 104 extends at least partially between the posts 1414. In FIG. 15A, tuning actuator 1412 is shown coupled to the bottom wall 1408 of housing 1402 in a first configuration engaging the bottom surface 1424 of optical fiber platform 1416.

The tuning actuator 1412, the posts 1414, the optical fiber platform 1416 and the housing 1402 cooperate to deform optical fiber 100. The tuning actuator 1412, which is rigidly coupled to bottom wall 1408 and in contact with optical fiber platform 1416, is adapted to vertically extend and contract. Referring now to FIG. 15C, shown is tuning actuator 1412 in a second configuration in which the tuning actuator 1412 is partially extended upwards, thereby pressing optical fiber platform 1416 upwards. The plurality of posts 1414 engage the top surface 1426 of the optical fiber platform 1416 proximal to opposed platform ends 1420, thereby preventing the end portions of the optical fiber platform from being vertically raised by the extension of actuator 1412. In response to the extension of actuator 1412 the portion of the optical fiber platform extending between the posts 1414(A) and 1414(B) becomes curved, as shown in FIG. 15B. When the actuator 1412 is contracted to its first configuration, shown in FIG. 15A, the optical fiber platform, which is made from a resilient material, returns to its generally flat shape.

In the preferred embodiment, the optical fiber 100 is disposed in groove 1428 and fixedly attached thereto by means such as adhesive. The optical fiber 100 is positioned such that at least a portion of the grating region 104 of the optical fiber is disposed between posts 1414(A) and 1414(B). Thus, when the tuning actuator 1412 is extended or contracted, thereby changing the curvature of the optical fiber platform 1416, the curvature of the grating region of the optical fiber changes correspondingly. The optical fiber platform 1416, with the optical fiber disposed thereon, can be bent or flexed by a variety of devices such as, but are not limited to, a piezoelectric apparatus, a micro-electro-mechanical apparatus, an electro-mechanical solenoid, a linear motor, a stepping motor and mechanical cam, a hydraulic apparatus, a pneumatic apparatus, a thermomechanical apparatus, a photoelastic apparatus, an acoustic apparatus, a magnetostrictive apparatus, and a electrostrictive apparatus.

In an alternative, non-limiting, embodiment, optical fiber 100 is fixedly clamped to optical fiber platform 1416 such that changes in the curvature of the optical fiber 100 correspond to changes in the contraction/expansion of the tuning actuator. In yet another non-limiting embodiment, optical fiber 100 is coupled to opposed ends 1404 such that the optical fiber extending therebetween engages the optical fiber platform, and such that changes in the curvature of the optical fiber correspond to changes in the expansion/contraction of tuning actuator 1412.

In another non-limiting embodiment, the opposed optical fiber ends 102 of the optical fiber 100 are rotatably mounted to opposed ends 1404 of tuning device 1400. Each opposed optical fiber end 102 of optical fiber 100 is independently axially rotatable. In this embodiment, the optical fiber, extending between the opposed ends 1404 of the tuning device, is not adhered to the optical fiber platform 1416. Rather, the optical fiber 100 is disposed in the platform groove 1428 and is rotatable therein. Thus, the grating region 104 of the optical fiber 100 is rotated by rotating the optical fiber ends 102. The grating region 104 can also be axially twisted about the centerline by counter rotating the opposed optical fiber ends 102, or by rotating just one of the opposed optical fiber ends, or by rotating one of the optical fiber ends. It should be noted that the optical fiber 100 is axially rotatable/twistable even when the optical fiber is not linearly aligned between the opposed ends 1404, e.g., even when the optical fiber region is curved in response to curvature of optical fiber platform 1416.

Figure 15D:
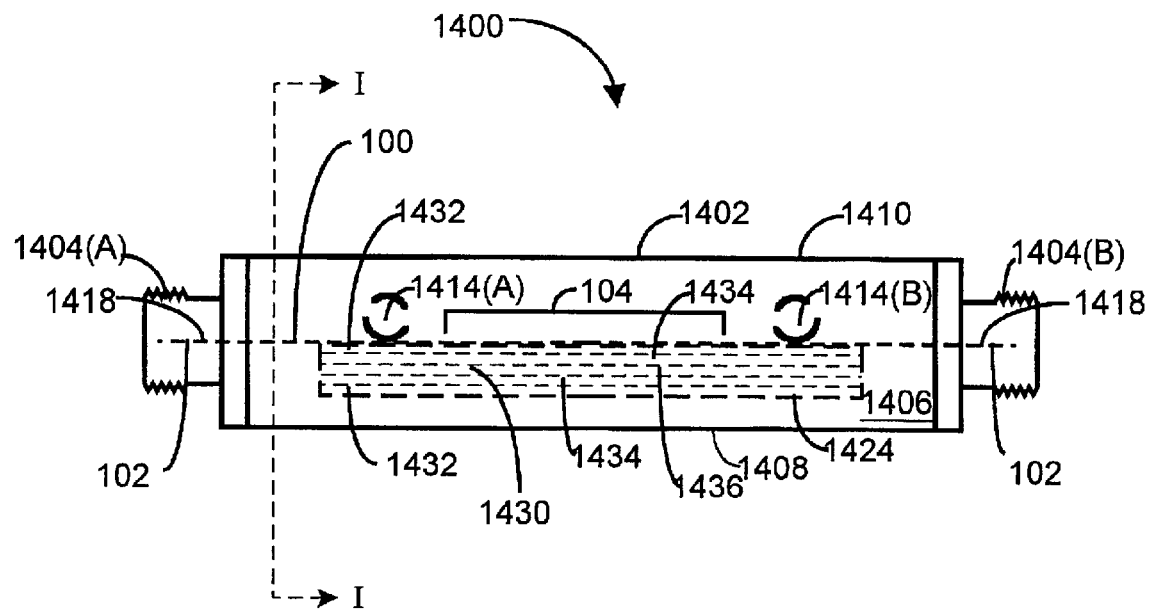
FIGS. 15D and 15E show another exemplary device for configuring an optical fiber.
Figure 15E:
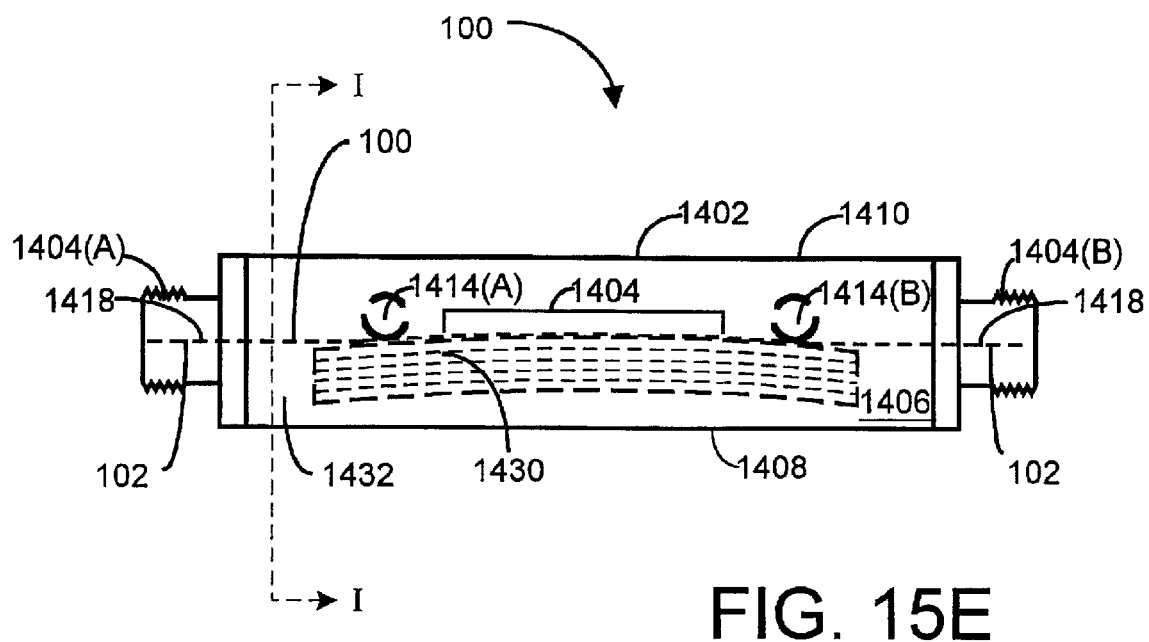

FIGS. 15D and 15E show an alternative embodiment of the tuning device 1400. In this embodiment, the optical fiber 100 is disposed on an optical fiber platform 1430 that is a commercially available piezo-ceramic layer, which are known to those skilled in the art. The piezo-ceramic layer includes opposed electrodes 1432 disposed on intermediate layers 1434, which sandwich a piezo-ceramic layer 1436 such as barium titanate or lead lanthanum zirconate titanate. The optical fiber platform 1430 curves in response to a voltage applied to the opposed electrodes 1432, as illustrated in FIG. 15E, thereby inducing a change in curvature of the optical fiber 100 disposed thereon. Thus, optical fiber platform 1430 positions the optical fiber 100 extending between opposed ends 1404 of housing 1402 and flexes to change the curvature of the grating region 104 of optical fiber 100 disposed thereon.

As previously demonstrated hereinabove, small changes in the curvature of the grating region may produce dramatic changes in the optical transmission characteristics of the optical fiber. Those skilled in the art will recognize that other embodiments, different than those disclosed hereinabove, exist for changing the relative orientation of the grating region, and all such embodiments are intended to be within the scope of the invention. The above-cited embodiments are intended to be non-limiting examples for positioning and flexing the optical fiber having azimuthally varying grating elements disposed therein.

From the above discussion of the current invention it should be understood by those skilled in the art that many implementations of the current invention are possible. It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A tunable waveguide device, the device comprising:
   a length of optical fiber having a core with a first index of refraction distribution and a cladding with a second index of refraction distribution disposed on the core, wherein the first index of refraction distribution and the second index of refraction distribution define the optical characteristics of the optical fiber, and wherein the cladding has a top surface and an opposed bottom surface; and
   a grating element disposed in said optical fiber, the grating element defined by a perturbation in the optical characteristics of the optical fiber, the perturbation in the optical characteristics of the optical fiber having an upper region and a bottom region, and wherein the perturbation in the optical characteristics of the optical fiber is azimuthally non-uniform in a plane extending between the upper region and the bottom region, and wherein the upper region extends downward from the top surface of the cladding.

2. The device of claim 1, wherein proximal to the upper region of the perturbation, the perturbation has a maximum width (Wmax), and the perturbation tapers therein such that proximal to the bottom region of the perturbation, the perturbation has a minimum width (Wmin).

3. The device of claim 1, further including:
   a plurality of grating elements, the plurality of grating elements including a first grating element having a first width and a second grating element having a second width, wherein the first width is different from the second width.

4. The device of claim 1, wherein the perturbation in the optical characteristics of the optical fiber varies azimuthally about a centerline defined by the core.

5. The device of claim 1, wherein the core defines a centerline and the grating element is approximately perpendicular with respect to the centerline.

6. The device of claim 1, wherein the core defines a centerline and the grating element is slanted with respect to the centerline.

7. The device of claim 1, wherein the perturbation in the optical characteristics of the optical fiber is a perturbation in the refractive index of the core, and the perturbation extends at least partially through the core of the optical fiber.

8. The device of claim 1, wherein the perturbation in the optical characteristics of the optical fiber is a perturbation in the refractive index of the cladding, and the perturbation extends at least partially through the cladding of the optical fiber.

9. The device of claim 1, wherein the perturbation in the optical characteristics of the optical fiber is a perturbation in the refractive index of the core and a perturbation of the refractive index of the cladding, and the perturbation extends at least partially through the cladding and the core of the optical fiber.

10. The device of claim 1, wherein the perturbation in the optical characteristics of the fiber is a perturbation in the real part of the refractive index of the optical fiber.

11. The device of claim 1, wherein the perturbation in the optical characteristics of the fiber is a perturbation in the imaginary part of the refractive index of the optical fiber.

12. The device of claim 1, wherein the perturbation in the optical characteristics of the fiber is a perturbation in the real and imaginary parts of the refractive index of the optical fiber.

13. The device of claim 1, wherein the perturbation in the optical characteristics of the optical fiber includes a plurality of perturbations in the refractive index of the optical fiber.

14. The device of claim 1, further including:
   a plurality of grating elements longitudinally disposed in the optical fiber, each grating element defined by a perturbation in the optical characteristics of the optical fiber, and wherein each perturbation is bounded by a pair of parallel planes traversing the core, the pair of parallel planes defining the maximum width of the perturbation, and each perturbation varies azimuthally in a third plane that is generally parallel to the pair of parallel planes and disposed therebetween.

15. The device of claim 14, wherein the distance between adjacent grating elements of the plurality of grating elements is approximately constant.

16. The device of claim 14, wherein the separation between adjacent first and second grating elements of the plurality of grating elements is a first length, the separation between adjacent second and third grating elements of the plurality of grating elements is a second length, and the first length and the second length are different.

17. The device of claim 14, wherein the plurality of grating elements includes a first grating element having a predetermined first set of optical characteristics and a second grating element having a second set of optical characteristics that are essentially the same.

18. The device of claim 17, wherein the second set of optical characteristics is effectively rotated with respect to the first set of optical characteristics about a centerline by the core, and the effective rotation is less than 360 degrees.

19. The device of claim 14, wherein the plurality of grating elements includes a first grating element having a predetermined first set of optical characteristics and a second grating element having a second set of optical characteristics that are essentially different.

20. The device of claim 14, wherein the plurality of grating elements include a first set multiple of grating elements having a first periodicity and a second set multiple of grating elements having a second periodicity, the first periodicity different then the second periodicity.

21. A method of selecting the coupling between the modes in an optical fiber, said method comprising the steps of:
disposing a grating having at least one azimuthally varying grating element in an optical network, wherein said grating is disposed in an optical fiber, said optical fiber having opposed first and second ends with a centerline extending therebetween, said centerline surrounded by a core, said core having a cladding disposed thereon, said cladding defining an outer surface of the optical fiber, and wherein said at least one azimuthally varying grating element is defined by a perturbation in the optical characteristics of the optical fiber having an upper region and a bottom region, and the perturbation extends inward from the outer surface of the cladding and is azimuthally non-uniform in a plane extending between the upper region and the bottom region of the perturbation; and
orienting said optical fiber in a predetermined position, wherein the optical characteristics of said optical fiber are related to the positioning of said optical fiber.

22. The method of claim 21, further including the step of:
twisting about said centerline a portion of said grating region of said optical fiber, whereby twisting said optical fiber changes the optical characteristics of said optical fiber.

23. The method of claim 21, further including the step of:
rotating about said centerline said grating region of said optical fiber, whereby rotating said optical fiber changes the optical characteristics of said optical fiber.

24. The method of claim 21, further including the step of:
flexing said optical fiber, wherein a portion of said centerline is moved relative to a straight line extending between said opposed first and second ends of said optical fiber thereby changing the optical characteristics of said fiber.

25. The method of claim 24, further including the step of:
rotating said optical fiber about said centerline, wherein rotating said optical fiber changes the optical characteristics of said fiber.

26. A tunable waveguide device, the device comprising:
a length of optical fiber having a core with a first index of refraction distribution and a cladding with a second index of refraction distribution disposed on the core, the cladding having a top surface and an opposed bottom surface; and
a grating defined by a plurality of grating elements longitudinally disposed along the length of the optical fiber, the plurality of grating elements including a first grating element defined by a first perturbation in the optical characteristics of the optical fiber and a second grating element defined by a second perturbation in the optical characteristics of the optical fiber, the first and second perturbations in the optical characteristics of the optical fiber each having an upper region and a bottom region and extending therebetween, wherein each one of the perturbations varies azimuthally in a plane extending between the upper region and the bottom region of the perturbation, and wherein the upper region of the first perturbation extends to the top surface of the cladding.

27. The device of claim 26, wherein the first perturbation extends at least partially into the core of the optical fiber.

28. The device of claim 26, wherein the cladding defines the outer surface of the optical fiber, wherein the first perturbation extends from the outer surface of the cladding to at least partially into the core, wherein the first perturbation is a perturbation in the refractive index of the cladding and a perturbation in the refractive index of the core.

29. The device of claim 26, wherein the first perturbation has a non-uniform width that generally tapers distal from the upper region of the first perturbation.

30. The device of claim 26, wherein the magnitude of the first perturbation is non-uniform and generally decreases distal from the upper region of the first perturbation.

31. The device of claim 26, wherein the optical fiber defines a center line having the optical fiber disposed there-around, and the first perturbation varies outwardly from the center line in the plane extending from the bottom region to the upper region.

32. The device of claim 26, the first perturbation is approximately azimuthally symmetric about an axis of symmetry extending from the bottom region to the upper region of the first perturbation.

33. The device of claim 26, wherein the core defines a centerline, and wherein the second perturbation is effectively rotated with respect to the first perturbation about the centerline such that the upper region of the second perturbation is not aligned with the upper portion of the first perturbation.

34. The device of claim 26, wherein the bottom region of the first perturbation is outside of the core and distal from the bottom surface of the cladding such that the first perturbation in the optical characteristics of the fiber is only a perturbation in the refractive index of the cladding.

35. The device of claim 26, wherein the first perturbation extends from the upper surface of the cladding and only partially into the core.

36. A tunable waveguide device, the device comprising:
an optical fiber having a longitudinal length, the optical fiber having a core with a first index of refraction distribution and a cladding with a second index of refraction distribution disposed on the core;
a first grating element disposed in the optical fiber, the first grating element defined by a plurality of perturbations in the optical characteristics of the optical fiber, wherein the plurality of perturbations are aligned in a plane, and wherein the optical characteristics of the optical fiber vary azimuthally in the plane having the plurality of perturbations therein; and a second grating element disposed in the optical fiber and longitudinally separated from the first grating element, the second grating element defined by at least one perturbation in the optical characteristics of the optical fiber, wherein the optical characteristics of the optical fiber vary azimuthally in a second plane having the at least one perturbation therein.

37. The device of claim 36, wherein the core defines a center line, and the plurality of perturbations of the first grating element are arranged about the center line in a predetermined fashion.

38. The device of claim 37, wherein in the plane having the plurality of perturbations therein, the angular separation between the perturbations as measured about the center line is approximately constant.

39. The device of claim 37, wherein in the plane having the plurality of perturbations therein, the angular separation between the perturbations as measured about the center line is approximately non-uniform.

40. The device of claim 36, wherein the cladding of the optical fiber defines an outer surface, and wherein the plurality of perturbations includes a given perturbation extending from the outer surface therein towards the core.

41. The device of claim 40, wherein given perturbation extends at least partially into the core.

42. The device of claim 40, wherein multiple perturbations of the plurality of perturbations extend from the outer surface of the cladding inward toward the core.

43. The device of claim 42, wherein at least one of the multiple perturbations of the plurality of pertubations extends at least partially into the core of the optical fiber.

* * * * *

UNITED STATES PATENT AND TRADEMARK OFFICE
CERTIFICATE OF CORRECTION

PATENT NO. : 6,832,023 B1
DATED : December 14, 2004
INVENTOR(S) : Gaylord et al.

It is certified that error appears in the above-identified patent and that said Letters Patent is hereby corrected as shown below:

Column 5,
Line 16, delete the word "14B" and replace with -- 14F --.

Column 8,
Line 40, after the number "302" delete the word "and to" and replace with -- into --.

Column 9,
Line 35, after the number "414" please insert -- , --.
Line 36, after the words "fiber core" please insert -- , --.
Line 36, after the words "cladding mode 416" delete -- , --.

Column 13,
Line 59, after the words "The horizontal" insert -- axis --.
Line 60, delete the reference number "1414I" and replace with -- 1414 --.

Column 19,
Line 21, after the words "first set" insert -- of --.
Line 21, after the word "multiple" delete -- of --.
Line 22, after the words "second set" insert -- of --.
Line 23, delete the word "of".

Signed and Sealed this

Nineteenth Day of April, 2005

JON W. DUDAS
*Director of the United States Patent and Trademark Office*